(12) United States Patent　　　(10) Patent No.:　US 12,674,764 B2

Urano et al.　　　(45) Date of Patent:　Jul. 7, 2026

(54) DEFECT INSPECTION DEVICE AND DEFECT INSPECTION METHOD

(71) Applicant: HITACHI HIGH-TECH CORPORATION, Tokyo (JP)

(72) Inventors: Yuta Urano, Tokyo (JP); Toshifumi Honda, Tokyo (JP); Takanori Kondo, Tokyo (JP); Yuta Tagawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 197 days.

(21) Appl. No.: 18/701,998

(22) PCT Filed: Dec. 23, 2021

(86) PCT No.: PCT/JP2021/048004

§ 371 (c)(1),
(2) Date: Apr. 17, 2024

(87) PCT Pub. No.: WO2023/119587

PCT Pub. Date: Jun. 29, 2023

(65) Prior Publication Data

US 2025/0237615 A1　　Jul. 24, 2025

(51) Int. Cl.
G01N 21/95　　(2006.01)
G01N 21/47　　(2006.01)

(52) U.S. Cl.
CPC ..... G01N 21/9501 (2013.01); G01N 21/4738 (2013.01); *G01N 2201/021* (2013.01); *G01N 2201/103* (2013.01)

(58) Field of Classification Search
CPC ........... G01N 21/4738; G01N 21/9501; G01N 21/956; G01N 2201/021; G01N 2201/103; H01L 22/00
See application file for complete search history.

(56) References Cited

U.S. PATENT DOCUMENTS

2003/0133604 A1*　7/2003　Neumann .......... G01N 21/9501
　　　　　　　　　　　348/126
2008/0013084 A1　1/2008　Matsui et al.
　　　　　　　　　　　(Continued)

FOREIGN PATENT DOCUMENTS

JP　　　2008-020359 A　　1/2008
JP　　　2011-013058 A　　1/2011
　　　　　　(Continued)

OTHER PUBLICATIONS

International Preliminary Report on Patentability received in corresponding International Application No. PCT/JP2021/048004 dated Jul. 4, 2024.

*Primary Examiner* — Hina F Ayub

(74) *Attorney, Agent, or Firm* — MATTINGLY & MALUR, PC

(57)　　　　　ABSTRACT

The system has a scanning device that rotates and drives the sample stage so as to change the relative positions of the sample and the illumination optical system; a plurality of detection optical systems that concentrate scattered illumination light from the surface of the sample; a plurality of sensors that convert the scattered illumination light concentrated by a corresponding detection optical system into electrical signals and output detection signals; and a signal processing device that processes the detection signals input from the plurality of sensors. With regard to any inspection location on the surface of the sample, the signal processing device extracts a comparison location in a correspondence relationship in which a θ coordinate has been set in an rθ circular coordinate system for the sample with the center of the sample serving as the origin point.

13 Claims, 11 Drawing Sheets

(56)     References Cited

U.S. PATENT DOCUMENTS

2010/0060895  A1 *    3/2010   Oshima ............. G01N 21/9501
                                                                      356/369
2012/0092656  A1      4/2012   Nakao et al.
2022/0317058  A1     10/2022   Yamamoto et al.

FOREIGN PATENT DOCUMENTS

WO          2021/014623  A1     1/2021
WO      WO-2023119587  A1 *   6/2023   ......... G01N 21/4738

* cited by examiner

[FIG. 1]
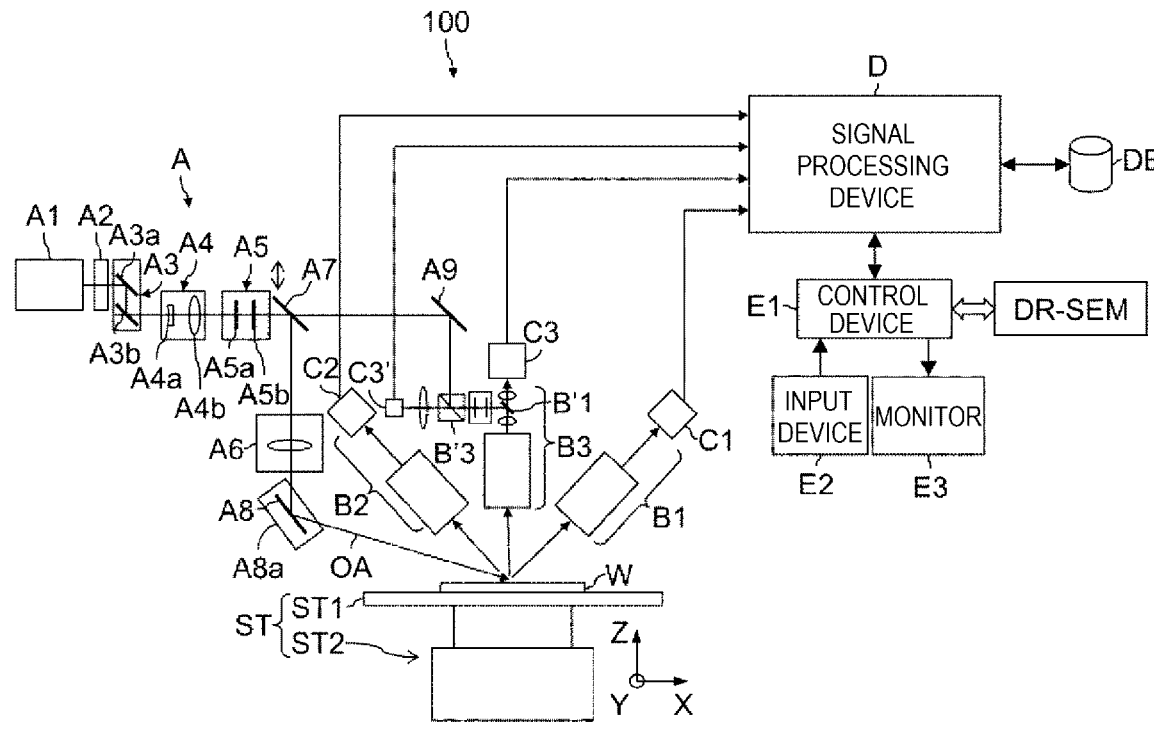
[FIG. 2]
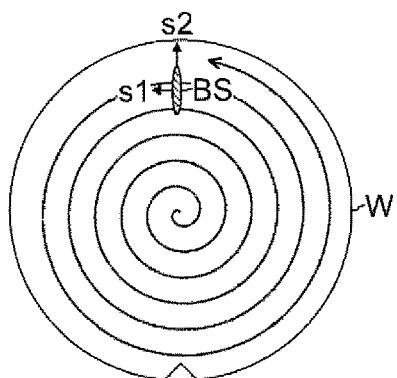
[FIG. 3]
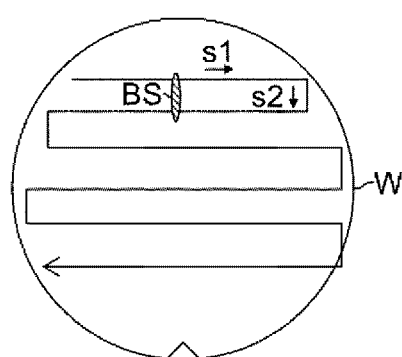

[FIG. 4]
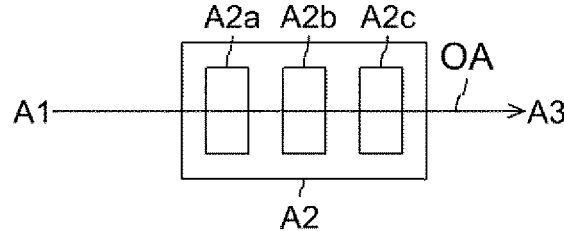
[FIG. 5]
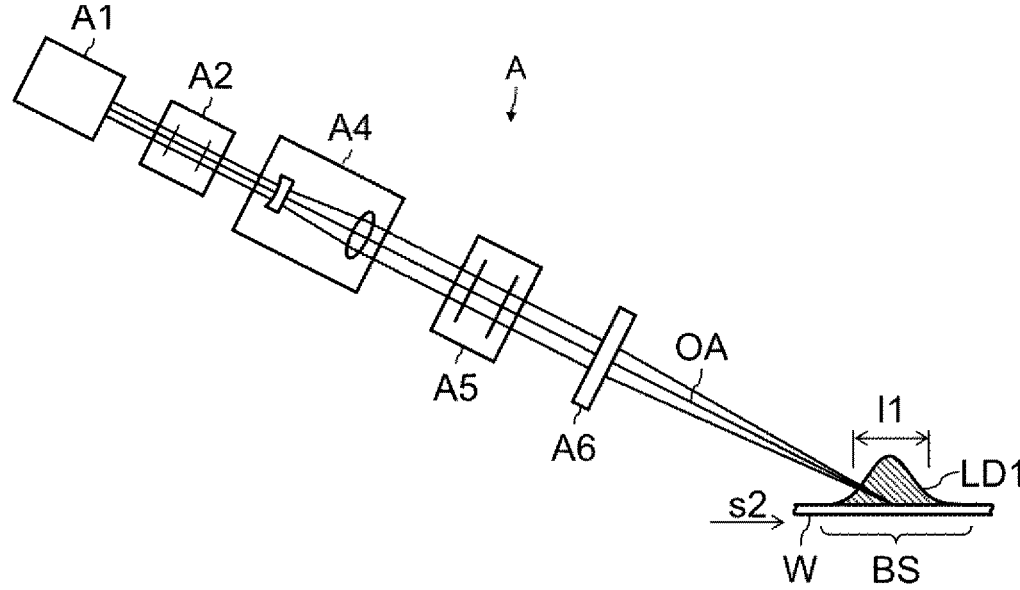
[FIG. 6]
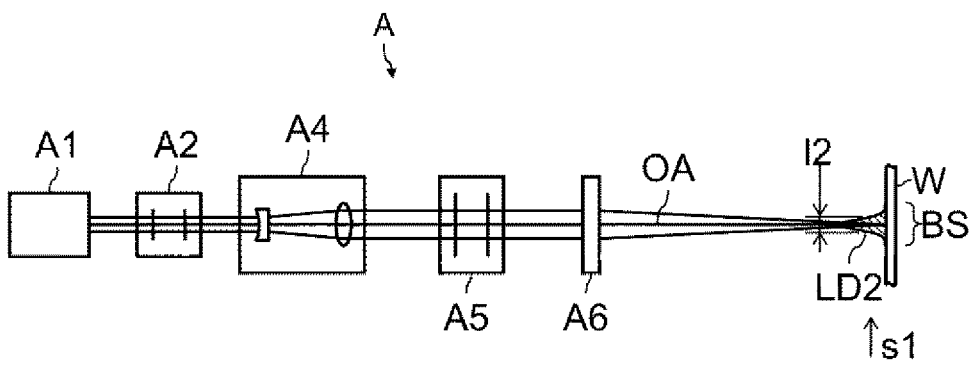

[FIG. 7]
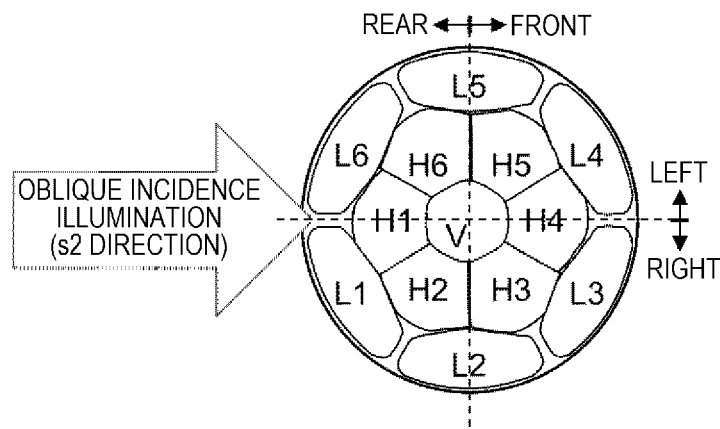
[FIG. 8]
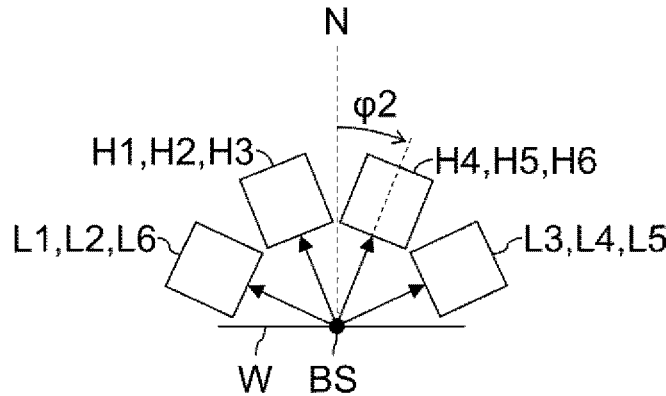
[FIG. 9]
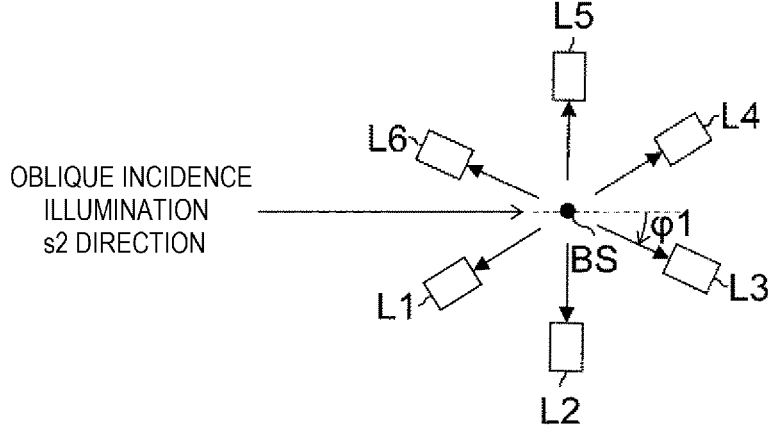

[FIG. 10]
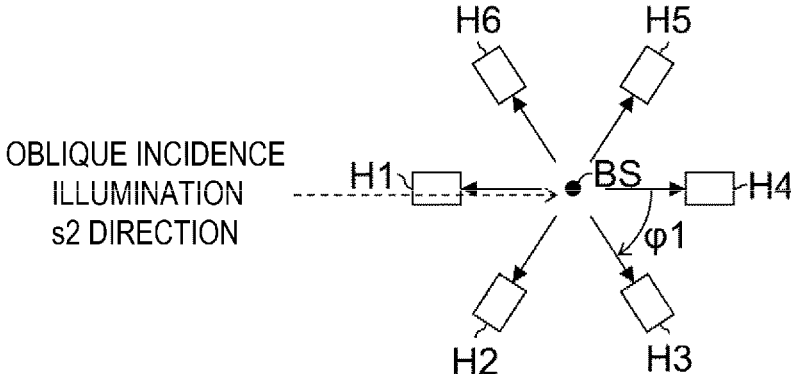
[FIG. 11]
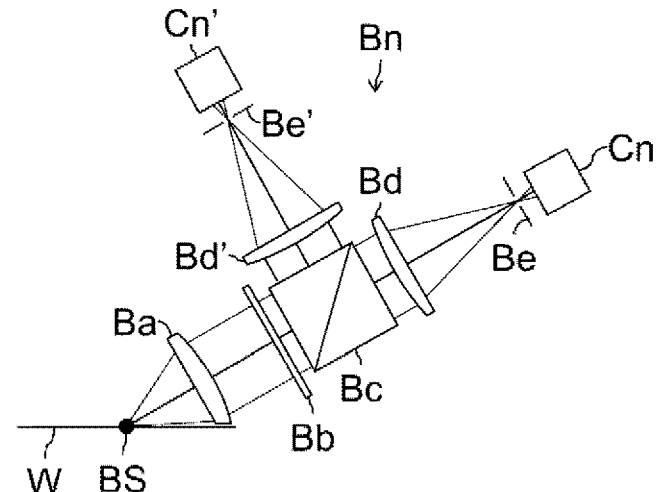
[FIG. 12]
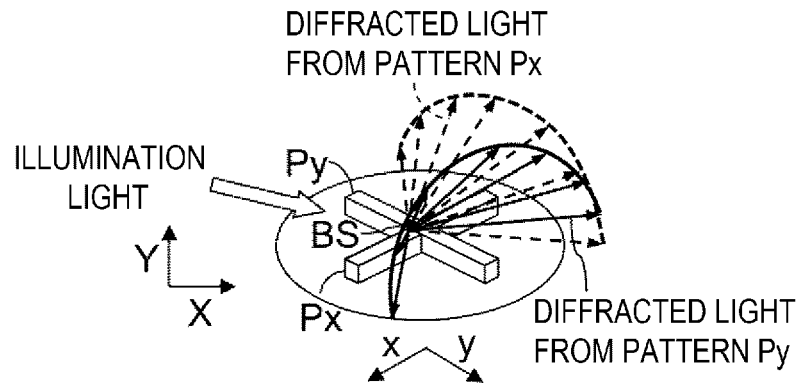

[FIG. 13]
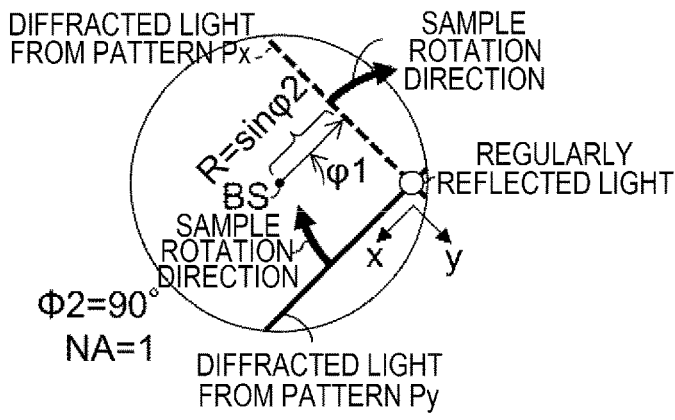
[FIG. 14]
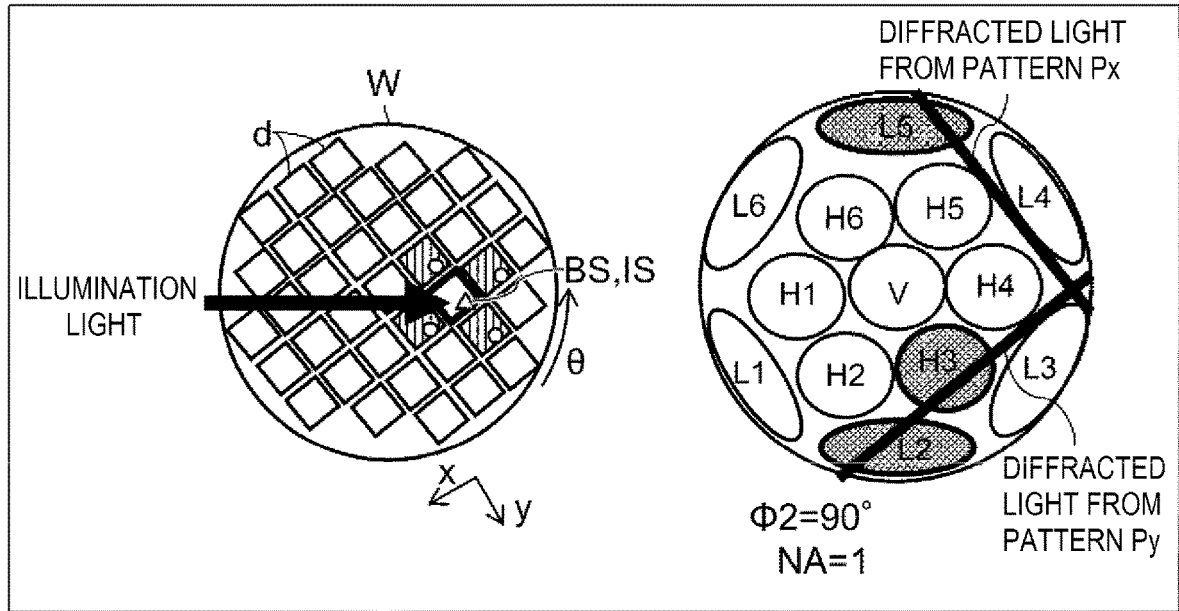

[FIG. 15]
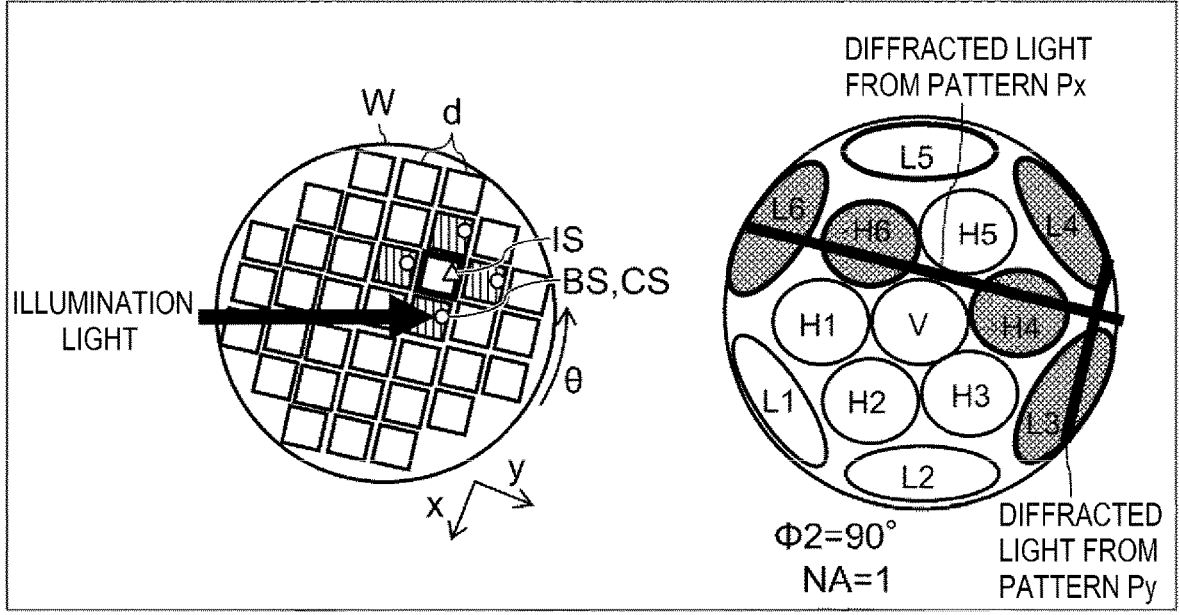
[FIG. 16]
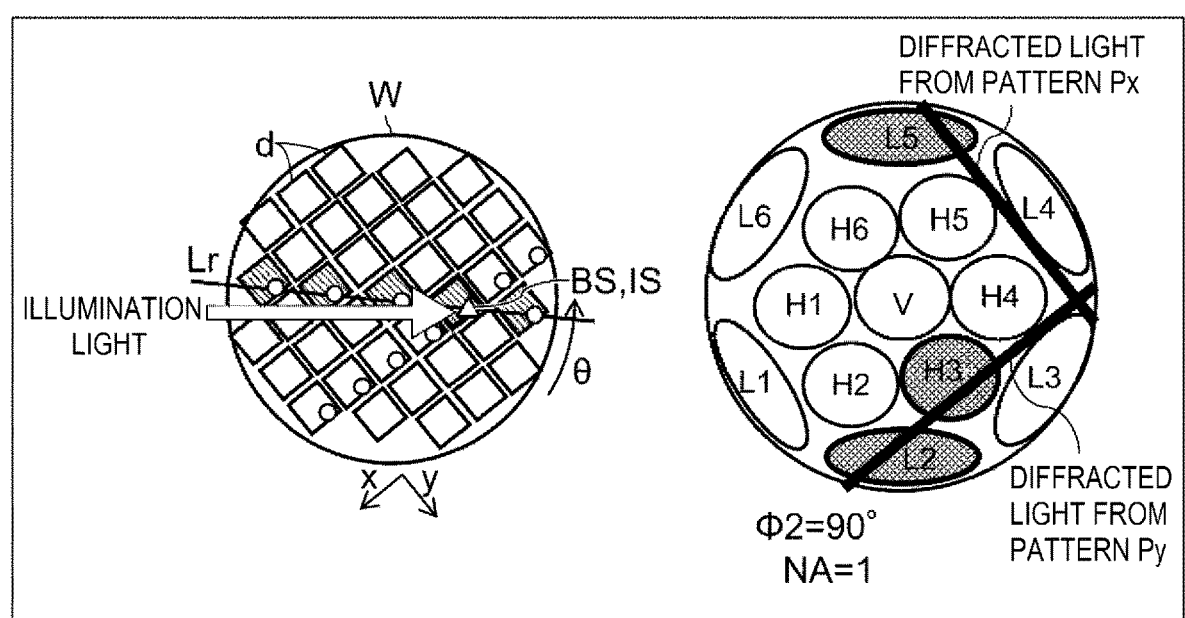

[FIG. 17]
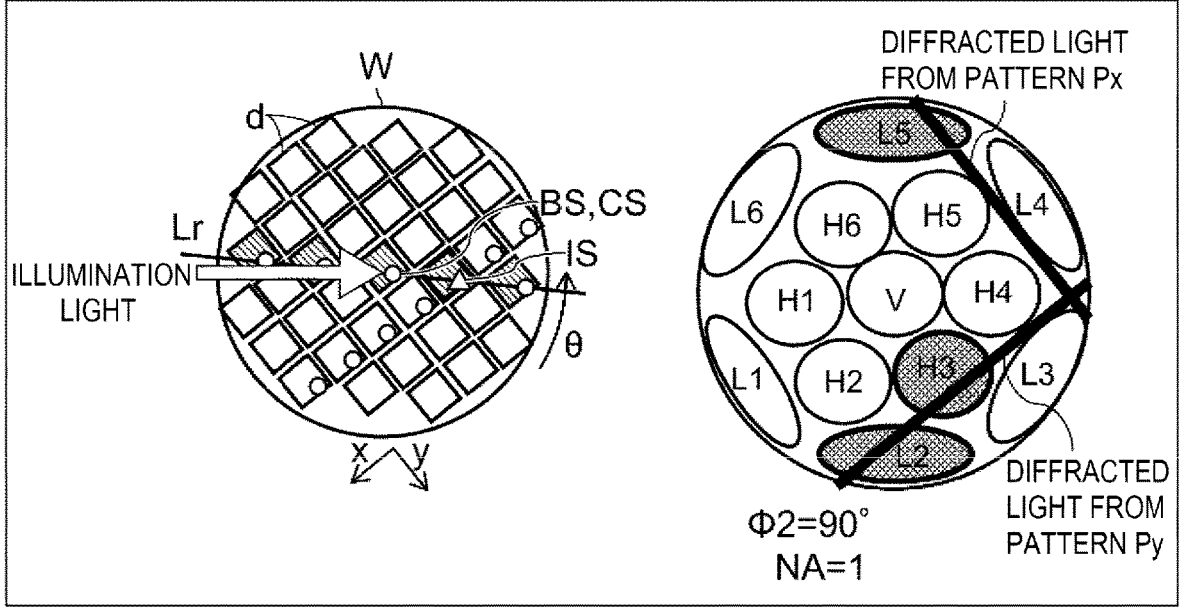
[FIG. 18]
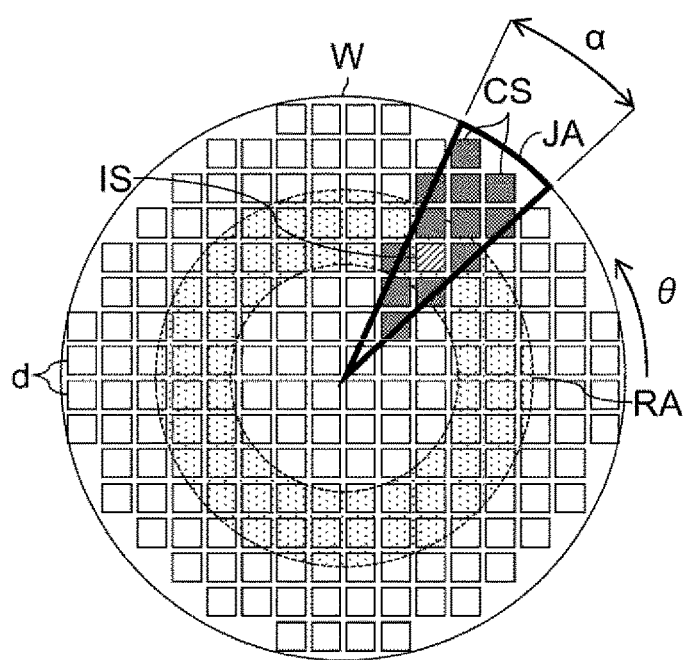

[FIG. 19]
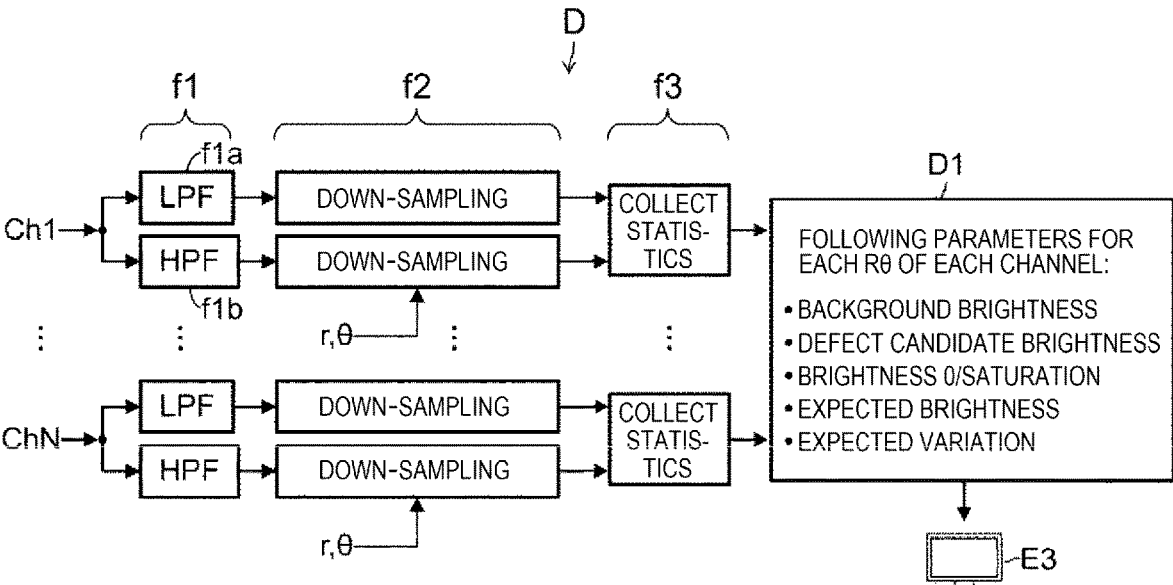
[FIG. 20]
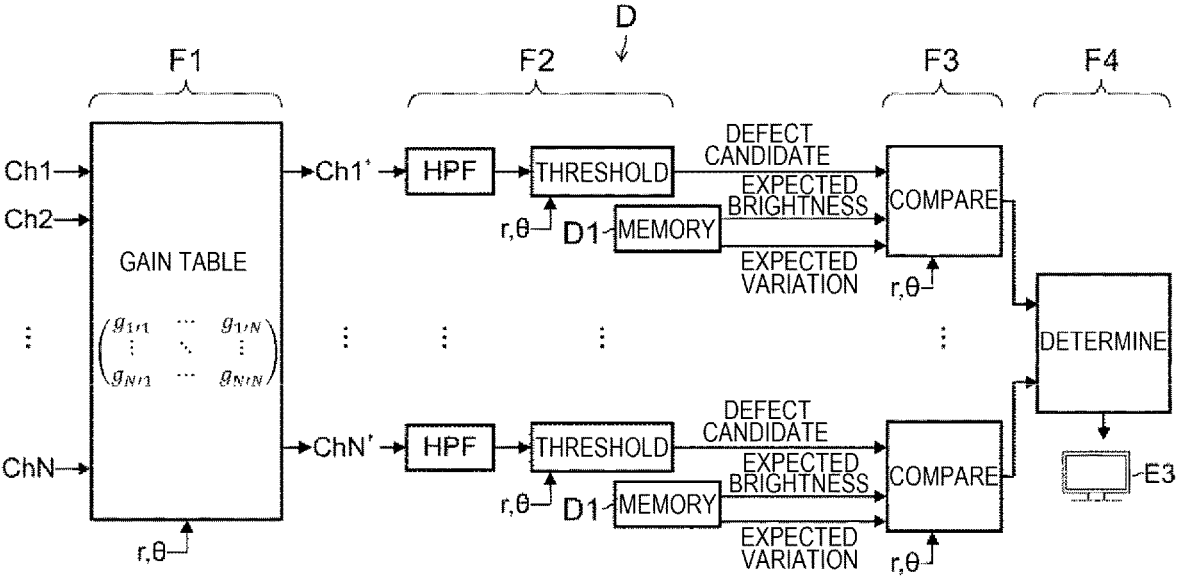

[FIG. 21]
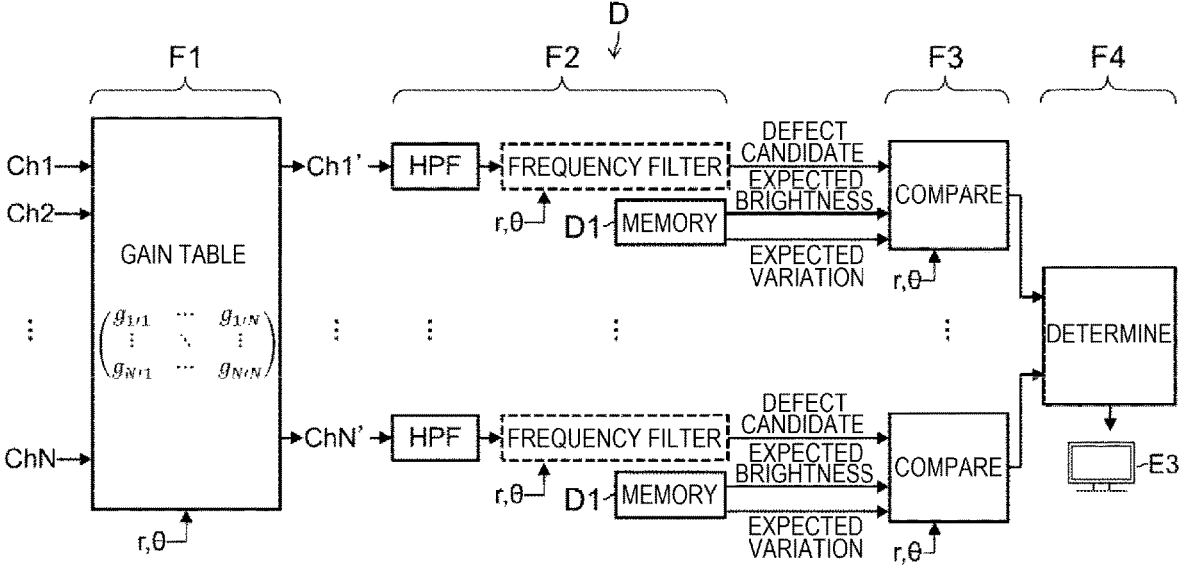
[FIG. 22]
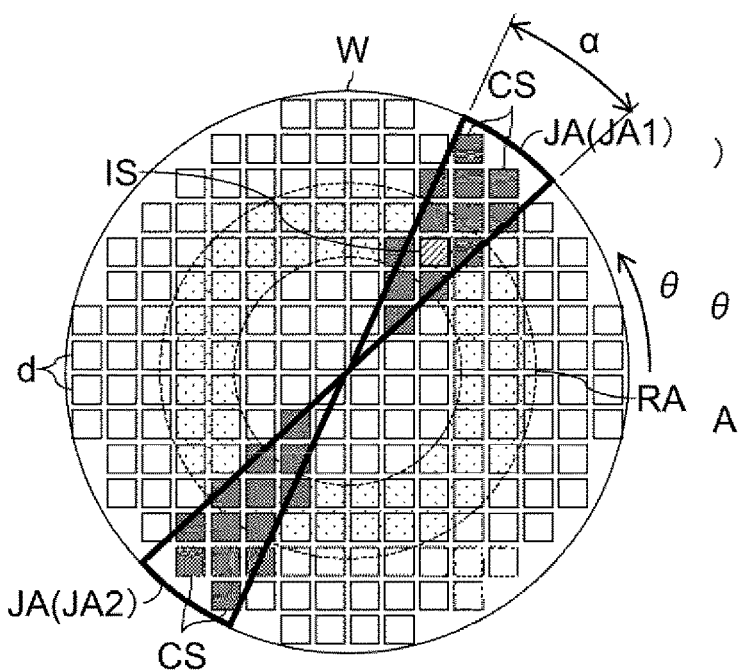

[FIG. 23]
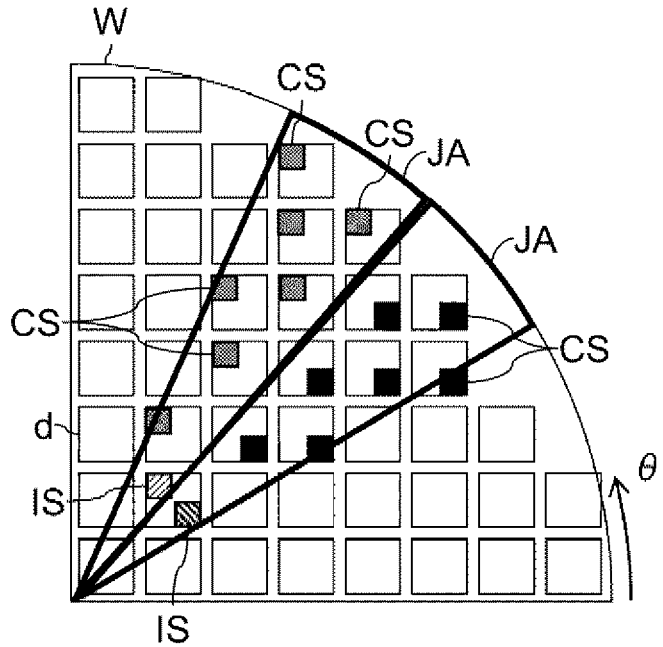
[FIG. 24]
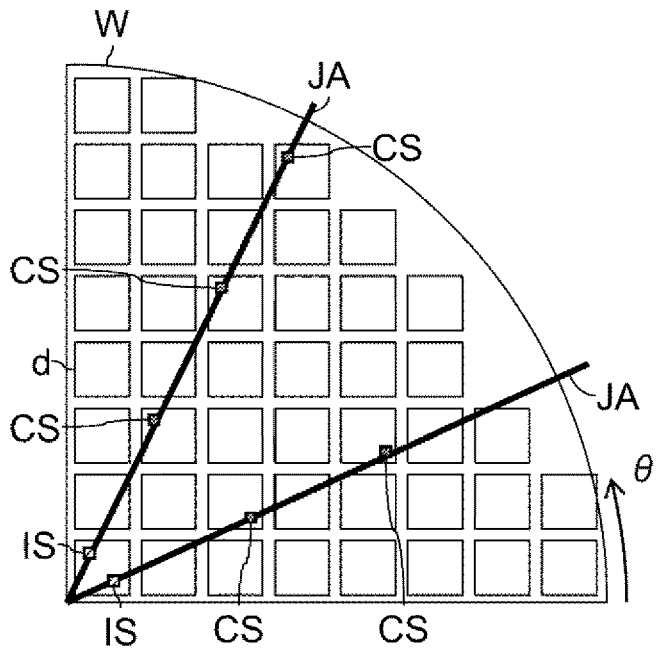

[FIG. 25]
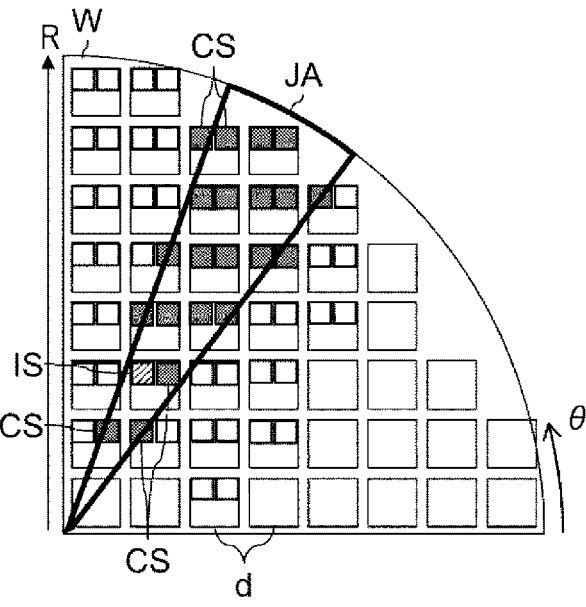
[FIG. 26]
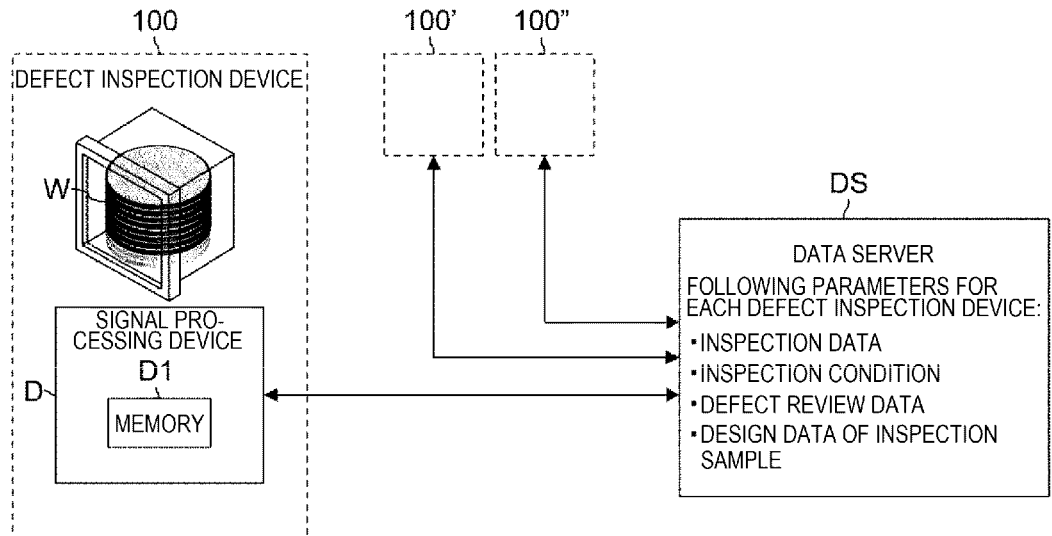
[FIG. 27]
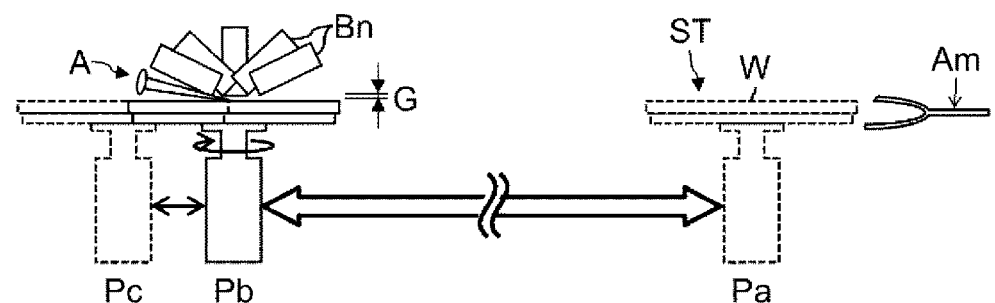

DEFECT INSPECTION DEVICE AND DEFECT INSPECTION METHOD

TECHNICAL FIELD

The present invention relates to a defect inspection device and a defect inspection method for rotating and inspecting a sample such as a wafer having a large number of microstructures such as semiconductor circuit patterns repeatedly formed on a surface thereof.

BACKGROUND ART

In a manufacturing line of a semiconductor substrate, a thin film substrate, or the like, a defect on a surface of the semiconductor substrate, the thin film substrate, or the like is inspected in order to improve a yield of a product. As a defect inspection device used for the defect inspection, a defect inspection device has been known that simultaneously detects scattered light from a sample surface by a plurality of sensors at different positions and acquires detailed information on a position, a shape, a size, and the like of a defect (see Patent Literature 1 and the like).

CITATION LIST

Patent Literature

Patent Literature 1: JP2011-013058A

SUMMARY OF INVENTION

Technical Problem

In the inspection of a sample (for example, a patterned wafer) such as a wafer having a large number of microstructures such as semiconductor circuit patterns repeatedly formed at regular intervals on a surface thereof, the microstructures formed normally may be erroneously detected as defects. In order to restrict this erroneous detection, it is effective to remove a signal from a normal microstructure by comparing inspection data of a plurality of predetermined regions (for example, dies). In the inspection for comparing a plurality of predetermined regions, a system of scanning a sample in longitudinal and transverse directions (XY directions) (hereinafter, referred to as an XY scanning system) is generally adopted. However, in the XY scanning system, since a stage is reciprocated at the time of scanning and acceleration and deceleration of the stage are repeated, a restriction on the processing speed is great.

On the other hand, a system in which a sample is moved in a radial direction (R direction) while being rotated in a circumferential direction (θ direction) for scanning (hereinafter, referred to as a rotary scanning system) as disclosed in Patent Literature 1 is more advantageous than the XY system in terms of throughput.

However, when the rotary scanning system is applied to the inspection of a sample such as a patterned wafer having a large number of microstructures repeatedly formed on a surface thereof, an angle of the microstructure in an illumination spot changes for each region accompanying the rotation of the sample during scanning. As a result, even in regions having the same surface structure, a difference occurs in signals from the microstructure, and it is difficult to remove the signal from the normally formed microstructure by comparison, and sufficient inspection accuracy cannot be secured.

An object of the invention is to provide a defect inspection device and a defect inspection method capable of accurately inspecting, by a rotary scanning system, a sample having a microstructure repeatedly formed on a surface thereof.

Solution to Problem

In order to achieve the above object, the invention provides a defect inspection device for inspecting a sample having a structure repeatedly formed on a surface thereof, the device including: a sample stage configured to support the sample; an illumination optical system configured to illuminate the sample placed on the sample stage with illumination light; a scanning device configured to drive and rotate the sample stage to change a relative position between the sample and the illumination optical system; a plurality of detection optical systems configured to condense illumination scattered light from the surface of the sample; a plurality of sensors configured to convert illumination scattered light condensed by the corresponding detection optical systems into an electric signal and output a detection signal; and a signal processing device configured to process the detection signal input from the plurality of sensors. The signal processing device extracts, for any inspection portion on the surface of the sample, a comparison portion whose θ coordinates are in a set correspondence relationship with those of the inspection portion in an rθ circular coordinate system of the sample in which a center of the sample is set as an origin, and compares a detection signal from the inspection portion with a detection signal from the comparison portion, and detects a defect of the sample based on a difference between the detection signals.

Advantageous Effects of Invention

According to the invention, a sample having a microstructure repeatedly formed on a surface thereof can be accurately inspected by a rotary scanning system.

BRIEF DESCRIPTION OF DRAWINGS

FIG. 1 is a schematic diagram of a configuration example of a defect inspection device according to the invention.

FIG. 2 is a schematic diagram illustrating a scanning trajectory on a sample.

FIG. 3 is a schematic diagram illustrating a scanning trajectory on a sample (comparative example).

FIG. 4 is a schematic diagram illustrating an extracted attenuator.

FIG. 5 is a schematic diagram illustrating a positional relationship between an optical axis of illumination light guided to a surface of a sample from an oblique direction and an illumination intensity distribution shape.

FIG. 6 is a schematic diagram illustrating a positional relationship between an optical axis of illumination light guided to a surface of a sample from an oblique direction and an illumination intensity distribution shape.

FIG. 7 is a diagram illustrating a region where a detection optical system collects scattered light as viewed from above.

FIG. 8 is a diagram schematically illustrating detection zenith angles of a low-angle detection optical system and a high-angle detection optical system.

FIG. 9 is a plan view illustrating a detection azimuth angle of the low-angle detection optical system.

FIG. 10 is a plan view illustrating a detection azimuth angle of the high-angle detection optical system.

FIG. 11 is a schematic diagram illustrating an extracted example of a configuration of a detection optical system.

FIG. 12 is a schematic diagram illustrating a relationship between an emission direction of pattern diffracted light and an angle of a sample.

FIG. 13 is a view in which a line of intersection between a spherical surface centered on an irradiation spot and a conical surface in a traveling direction of diffracted light is projected onto an xy plane.

FIG. 14 is a schematic diagram illustrating a change in an emission direction of diffracted light due to a rotation angle of a sample with respect to illumination light.

FIG. 15 is a schematic diagram illustrating a change in an emission direction of diffracted light due to a rotation angle of a sample with respect to illumination light.

FIG. 16 is a schematic diagram illustrating a typical example in which the emission directions of diffracted light from an inspection portion and a comparison portion are substantially the same.

FIG. 17 is a schematic diagram illustrating a typical example in which the emission directions of diffracted light from an inspection portion and a comparison portion are substantially the same.

FIG. 18 is an illustrative diagram of a correspondence relationship between θ coordinates of the inspection portion and the comparison portion in a first embodiment of the invention.

FIG. 19 is a functional block diagram illustrating an example of processing of advance acquisition of comparison data.

FIG. 20 is a functional block diagram illustrating a procedure of defect inspection executed by a signal processing device.

FIG. 21 is a functional block diagram illustrating a procedure of defect inspection of a defect inspection device according to a second embodiment of the invention.

FIG. 22 is an illustrative diagram of a correspondence relationship between θ coordinates of an inspection portion and a comparison portion which is applied to a defect inspection device according to a third embodiment of the invention.

FIG. 23 is an illustrative diagram of a correspondence relationship between θ coordinates of an inspection portion and a comparison portion which is applied to a defect inspection device according to a fourth embodiment of the invention.

FIG. 24 is an illustrative diagram of a correspondence relationship between θ coordinates of an inspection portion and a comparison portion which is applied to a defect inspection device according to a fifth embodiment of the invention.

FIG. 25 is an illustrative diagram of a correspondence relationship between θ coordinates of an inspection portion and a comparison portion which is applied to a defect inspection device according to a sixth embodiment of the invention.

FIG. 26 is a schematic diagram illustrating extracted main parts of a defect inspection device according to a seventh embodiment of the invention.

FIG. 27 is a schematic diagram illustrating extracted main parts of a defect inspection device according to an eighth embodiment of the invention.

DESCRIPTION OF EMBODIMENTS

Hereinafter, embodiments of the invention will be described with reference to the drawings.

Defect inspection devices, to which the invention is applied, in the following embodiments are used for defect inspection of a surface of a sample (wafer) performed during a manufacturing process of, for example, a semiconductor. In particular, a defect inspection device of the present embodiment is preferably used for inspection of a wafer (patterned wafer) having a large number of microstructures such as semiconductor circuit patterns repeatedly formed at regular intervals on a surface thereof. According to defect inspection devices according to the embodiments, it is possible to perform, at high speed, processing of detecting a minute defect of a sample and acquiring data on the number, position, dimension, and type of the defect.

First Embodiment

Defect Inspection Device

FIG. 1 is a schematic diagram of a configuration example of a defect inspection device 100 according to the embodiment. An XYZ orthogonal coordinate system in which a Z axis is extended in a vertical direction is defined as illustrated in FIG. 1. The defect inspection device 100 takes a sample W as an object to be inspected and detects a defect of the sample W such as a film formation abnormality or adhesion of a foreign matter on a surface thereof. The defect inspection device 100 is a rotary scanning system in which the sample W is moved in a radial direction (R direction) while being rotated in a circumferential direction (θ direction) for scanning.

The defect inspection device 100 can also inspect a semiconductor silicon wafer (substrate) on which no pattern is formed. In the embodiment, a case in which the defect inspection device 100 inspects a patterned wafer will be described as an example, the patterned wafer being obtained by arranging dies in XY directions (in matrix) on a surface of a substrate. On one die, micro circuit patterns (microstructures) are densely formed. In addition, in the specification of the present application, the unit exposed at one time to form the die is described as a shot. When exposure is performed on a die basis in a manufacturing process of the sample W, the die and the shot are substantially the same region, and a plurality of dies may be disposed in the same shot. When the same shot includes a plurality of dies, all the dies in the shot may have the same pattern, and the dies disposed in the same shot may have different patterns.

The defect inspection device 100 includes a stage ST, an illumination optical system A, a plurality of detection optical systems B1 to Bn (n=1, 2, . . . ), sensors C1 to Cn, C1' to Cn' (n=1, 2, . . . ), a signal processing device D, a storage device DB, a control device E1, an input device E2, and a monitor E3.

Stage

The stage ST is a device including a sample stage ST1 and a scanning device ST2. The sample stage ST1 is a stage that supports the sample W. The scanning device ST2 is a device that drives the sample stage ST1 to change a relative position between the sample W and the illumination optical system A. Although a detailed illustration is omitted, the scanning device ST2 includes a translation stage, a rotary stage, and a Z stage. The rotary stage is mounted on the translation stage via the Z stage, and the sample stage ST1 is supported on the rotary stage. The translation stage performs a translational movement in a horizontal direction together with the rotary stage. The rotary stage rotates about a rotation axis (rotates on its own axis) extending vertically. The Z stage functions to adjust a height of a surface of the sample W.

FIG. 2 is a schematic diagram illustrating a scanning trajectory on the sample W by the scanning device ST2. As will be described later, an illumination spot BS which is an incident area of illumination light emitted from the illumination optical system A to the surface of the sample W is a minute point, and has an illumination intensity distribution long in one direction as illustrated in FIG. 2. A major axis direction of the illumination spot BS is defined as s2, and a direction intersecting the major axis (for example, a minor axis direction orthogonal to the major axis) is defined as s1. The sample W rotates with the rotation of the rotary stage, the scanning is performed with the illumination spot BS in the s1 direction relative to the surface of the sample W, the sample W moves in the horizontal direction with the translation of the translation stage, and the scanning is performed with the illumination spot BS in the s2 direction relative to the surface of the sample W. When the sample W performs a translational movement while being rotated by such an operation of the scanning device ST2, as illustrated in FIG. 2, the illumination spot BS moves presenting a spiral trajectory from the center to an outer edge of the sample W, and the entire surface of the sample W is scanned. The illumination spot BS moves in the s2 direction by a distance equal to or less than a length of the illumination spot BS in the s2 direction during one rotation of the sample W.

There is generally a scanning device having a configuration in which another translation stage whose movement axis extends in a direction intersecting a movement axis of the translation stage in a horizontal plane is provided instead of the rotary stage. In this case, as illustrated in FIG. 3, the surface of the sample W is scanned with the illumination spot BS in a folded linear trajectory instead of the spiral trajectory. Specifically, the first translation stage performs a translational movement in the s1 direction at a constant speed, the second translation stage is driven in the s2 direction by a predetermined distance (for example, a distance equal to or less than the length of the illumination spot BS in the s2 direction), and then the first translation stage turns back in the s1 direction again to be translated. Accordingly, the entire surface of the sample W is scanned with the illumination spot BS by repeating linear scanning in the s1 direction and movement in the s2 direction. Compared with the XY scanning system, according to the rotary scanning method of the embodiment, since a reciprocating operation of repeating acceleration and deceleration does not occur, an inspection time of the sample W can be shortened.

Illumination Optical System

The illumination optical system A illustrated in FIG. 1 includes an optical element group for illuminating the sample W placed on the sample stage ST1 with desired illumination light. As illustrated in FIG. 1, the illumination optical system A includes a laser light source A1, an attenuator A2, an emitted light adjustment unit A3, a beam expander A4, a polarization control unit A5, a light condensing optical unit A6, reflecting mirrors A7 to A9, and the like.

Laser Light Source

The laser light source A1 is a unit that emits a laser beam as illumination light. When detecting a minute defect in the vicinity of the surface of the sample W by the defect inspection device 100, a device that oscillates a high-power laser beam having an output of 2 W or more is used as the laser light source A1, the laser beam being ultraviolet or vacuum ultraviolet having a short wavelength (wavelength of 355 nm or less) that hardly penetrates into the sample W. A diameter of the laser beam emitted from the laser light source A1 is typically about 1 mm. When detecting a defect inside the sample W by the defect inspection device 100, a device that oscillates a visible or infrared laser beam having a long wavelength and easily penetrating into the sample W is used as the laser light source A1.

Attenuator

FIG. 4 is a schematic diagram illustrating the attenuator A2. The attenuator A2 is a unit that attenuates the light intensity of the illumination light from the laser light source A1, and in the embodiment, a configuration in which a first polarization plate A2*a*, a half-wave plate A2*b*, and a second polarization plate A2*c* are combined is illustrated. The half-wave plate A2*b* is rotatable around an optical axis of the illumination light. The illumination light incident on the attenuator A2 is converted into linearly polarized light by the first polarization plate A2*a*, and then passes through the second polarization plate A2*c* after a polarization direction thereof is adjusted to a slow axis azimuth angle of the half-wave plate A2*b*. The light intensity of the illumination light is attenuated at any ratio by the azimuth angle adjustment of the half-wave plate A2*b*. When a linear polarization degree of the illumination light incident on the attenuator A2 is sufficiently high, the first polarization plate A2*a* may be omitted. As the attenuator A2, an attenuator for which a relationship between the incident illumination light and a light reduction rate is calibrated in advance is used. The attenuator A2 is not limited to the configuration illustrated in FIG. 4, and may be implemented using an ND filter having a gradation density distribution, or may be a configuration capable of adjusting the attenuation effect by a combination of a plurality of ND filters having different densities.

Emitted Light Adjustment Unit

The emitted light adjustment unit A3 illustrated in FIG. 1 is a unit that adjusts an angle of the optical axis of the illumination light attenuated by the attenuator A2, and includes a plurality of reflecting mirrors A3*a* and A3*b* in the embodiment. Although the illumination light is sequentially reflected by the reflecting mirrors A3*a* and A3*b*, in the embodiment, an incidence/emission plane of the illumination light with respect to the reflecting mirror A3*a* is orthogonal to an incidence/emission plane of the illumination light with respect to the reflecting mirror A3*b*. The incidence/emission plane is a plane including an optical axis of light incident on the reflecting mirror and an optical axis of light emitted from the reflecting mirror. When the illumination light is incident on the reflecting mirror A3*a* in a +X direction, a traveling direction of the illumination light is changed to a +Y direction by the reflecting mirror A3*a* and then to a +Z direction by the reflecting mirror A3*b*, for example, which is different from the schematic illustration in FIG. 1. In this example, the incidence/emission plane of the illumination light with respect to the reflecting mirror A3*a* is an XY plane, and an incidence/emission surface with respect to the reflecting mirror A3*b* is a YZ plane. The reflecting mirrors A3*a* and A3*b* are provided with mechanisms (not shown) for causing the reflecting mirrors A3*a* and A3*b* to perform a translational movement and tilt. The reflecting mirrors A3*a* and A3*b* perform a translational movement in, for example, an incident direction or an emission direction of illumination light with respect to the reflecting mirrors A3*a* and A3*b*, and tilt around a normal line to the incidence/emission planes thereof. Accordingly, for example, with respect to the optical axis of the illumination light emitted in the +Z direction from the emitted light adjustment unit A3, an offset amount and an angle in an XZ plane and an offset amount and an angle in the YZ plane can be independently adjusted. Although a configuration using two reflecting mirrors A3*a* and A3*b* is illustrated in this example, a configuration using three or more reflecting mirrors may be used.

Beam Expander

The beam expander A4 is a unit that enlarges a beam diameter of incident illumination light, and includes a plurality of lenses A4*a* and A4*b*. An example of the beam expander A4 is a Galileo type using a concave lens as the lens A4*a* and a convex lens as the lens A4*b*. The beam expander A4 includes an interval adjustment mechanism (zoom mechanism) for the lenses A4*a* and A4*b*, and a magnification ratio of the beam diameter is changed by adjusting an interval between the lenses A4*a* and A4*b*. The magnification ratio of the beam diameter by the beam expander A4 is about 5 to 10 times. In this case, if the beam diameter of the illumination light emitted from the laser light source A1 is 1 mm, a beam system of the illumination light is enlarged to about 5 mm to 10 mm. When the illumination light incident on the beam expander A4 is not a parallel beam, the illumination light can be collimated (quasi-collimated) together with the beam diameter by adjusting the interval between the lenses A4*a* and A4*b*. Alternatively, the beam may be collimated by a collimating lens installed upstream of the beam expander A4 separately from the beam expander A4.

The beam expander A4 is installed on a translation stage having two or more axes (two-degree-of-freedom or higher), and a position thereof can be adjusted so that a center thereof coincides with a center of the incident illumination light. Further, the beam expander A4 is also provided with a tilt angle adjustment function having two or more axes (two-degree-of-freedom or higher) so that an optical axis of light transmitting in the beam expander A4 coincides with the optical axis of the incident illumination light.

Although not particularly illustrated, a state of the illumination light incident on the beam expander A4 is measured by a beam monitor in the middle of an optical path of the illumination optical system A.

Polarization Control Unit

The polarization control unit A5 is an optical system that controls a polarization state of the illumination light, and includes a half-wave plate A5*a* and a quarter-wave plate A5*b*. For example, when the sample W is obliquely illuminated by placing the reflecting mirror A7 to be described later into the optical path, the illumination light is set to p-polarized light by the polarization control unit A5, so that the amount of scattered light from a defect on the surface of the sample W can be increased compared to polarized light other than the p-polarized light. When scattered light (referred to as haze) from minute unevenness on the surface of the sample W obstructs the detection of a minute defect, the illumination light is set to s-polarized light, so that the haze can be reduced compared to polarized light other than the s-polarized light. The polarization control unit A5 can also set the illumination light to circularly-polarized light or to 45°-polarized light between the p-polarized light and s-polarized light.

Reflecting Mirror

As illustrated in FIG. 1, the reflecting mirror A7 performs a translational movement in an arrow direction by a driving mechanism (not shown), and enters and exits the optical path of the illumination light traveling toward the sample W. Accordingly, an incidence path of the illumination light to the sample W is switched. By inserting the reflecting mirror A7 into the optical path, the illumination light emitted from the polarization control unit A5 as described above is reflected by the reflecting mirror A7 and then is obliquely incident on the sample W through the light condensing optical unit A6 and the reflecting mirror A8. In this specification of the present application, causing the illumination light to be incident on the sample W from a direction inclined with respect to a normal line of the surface of the sample W is referred to as "oblique incidence illumination". On the other hand, when the reflecting mirror A7 is removed from the optical path, the illumination light emitted from the polarization control unit A5 is perpendicularly incident on the sample W via the reflecting mirror A9, a polarization beam splitter B'3, a polarization control unit B'2, a reflecting mirror B'1, and the detection optical system B3. Such incidence of the illumination light perpendicular to the surface of the sample W is referred to as "vertical illumination" in this specification of the present application.

FIGS. 5 and 6 are schematic diagrams illustrating positional relationships between the optical axis of the illumination light guided to the surface of the sample W from an oblique direction by the illumination optical system A and an illumination intensity distribution shape. FIG. 5 schematically illustrates a cross section of the sample W taken along an incidence plane of the illumination light incident on the sample W. FIG. 6 schematically illustrates a cross section of the sample W taken along a plane, the plane being orthogonal to an incidence plane of the illumination light incident on the sample W and including a normal line of the surface of the sample W. The incidence plane is a plane including an optical axis OA of the illumination light incident on the sample W and the normal line of the surface of the sample W. In FIGS. 5 and 6, a part of the illumination optical system A is extracted and illustrated. For example, the emitted light adjustment unit A3 and the reflecting mirrors A7 and A8 are not illustrated.

As described above, when the reflecting mirror A7 is inserted into the optical path, the illumination light emitted from the laser light source A1 is condensed by the light condensing optical unit A6, is reflected by the reflecting mirror A8, and is obliquely incident on the sample W. In this way, the illumination optical system A allows the illumination light to be obliquely incident on the surface of the sample W. In the oblique incidence illumination, the light intensity is adjusted by the attenuator A2, the beam diameter is adjusted by the beam expander A4, and the polarization is adjusted by the polarization control unit A5, and the illumination intensity distribution is made uniform in the incidence plane. As in an illumination intensity distribution (illumination profile) LD1 illustrated in FIG. 5, the illumination spot formed on the sample W has a light intensity distribution of Gaussian distribution in the s2 direction, and a length of a beam width 11 defined by 13.5% of the peak is, for example, about 25 μm to 4 mm.

In a plane orthogonal to the incidence surface and the sample surface, the illumination spot has a light intensity distribution in which the intensity in the periphery is weak with respect to that at the center of the optical axis OA as in an illumination intensity distribution (illumination profile) LD2 illustrate in FIG. 6. The light intensity distribution is, for example, a Gaussian distribution reflecting the intensity distribution of the light incident on the light condensing optical unit A6, or an intensity distribution similar to a Bessel function of the first kind or a sinc function reflecting an aperture shape of the light condensing optical unit A6. A length 12 of the illumination intensity distribution in the plane orthogonal to the incidence plane and the sample surface is set to be shorter than the beam width 11 shown in FIG. 5, for example, about 1.0 μm to 20 μm in order to reduce the haze generated from the surface of the sample W.

The length 12 of the illumination intensity distribution is a length of a region having an illumination intensity of 13.5% or more of the maximum illumination intensity in the plane orthogonal to the incidence plane and the sample surface.

An incident angle with respect to the sample W (a tilt angle of an incidence optical axis with respect to the normal line of the sample surface) in the oblique incidence illumination is adjusted to an angle suitable for detecting a minute defect by the positions and angles of the reflecting mirrors A7 and A8. The angle of the reflecting mirror A8 is adjusted by an adjustment mechanism A8a. For example, as the incident angle of the illumination light with respect to the sample W increases (as an illumination elevation angle formed by the sample surface and the incidence optical axis decreases), the scattered light from minute unevenness or patterns on the sample surface (hereinafter referred to as "haze"), which becomes noise with respect to the scattered light from a minute defect on the sample surface, weakens. From the viewpoint of reducing the influence of the haze on the detection of the minute defect, the incident angle of the illumination light is preferably set to, for example, 75 degrees or larger (that is, the elevation angle is 15 degrees or smaller). On the other hand, in the oblique incidence illumination, since the absolute amount of the scattered light from minute foreign matters increases as an illumination incident angle decreases, it is preferable to set the incident angle of the illumination light to, for example, 60 degrees or larger and 75 degrees or smaller (that is, the elevation angle of is 15 degrees or larger and 30 degrees or smaller) from the viewpoint of aiming at an increase in the amount of scattered light from the defect. In order to obtain scattered light from a dent-like defect on the surface of the sample W, vertical illumination is suitable in which the reflecting mirror A7 is removed from the optical path of the illumination optical system A and the illumination light is incident on the surface of the sample W substantially perpendicularly.

Detection Optical System

Each of the detection optical systems B1 to Bn (n=1, 2, . . . ) is a unit that condenses illumination scattered light from the sample surface, and includes a plurality of optical elements including a light condensing lens (objective lens). The n of the detection optical system Bn indicates the number of detection optical systems, and a case in which the defect inspection device 100 according to the embodiment includes 13 detection optical systems will be described as an example (n=13). However, the number of detection optical systems B1 to Bn is not limited to 13, and may be appropriately increased or decreased. The layout of detection apertures (described later) of the detection optical systems B1 to Bn can also be appropriately changed.

FIG. 7 is a diagram illustrating regions where the detection optical systems B1 to B13 collect scattered light as viewed from above, and corresponds to the arrangement of the objective lenses of the detection optical systems B1 to B13. FIG. 8 is a diagram schematically illustrating detection zenith angles of low-angle optical systems and high-angle optical systems among the detection optical systems B1 to B13. FIG. 9 is a plan view illustrating detection azimuth angles of the low-angle detection optical systems. FIG. 10 is a plan view illustrating detection azimuth angles of the high-angle detection optical systems.

In the following description, with reference to the incident direction of the oblique incidence illumination on the sample W, a traveling direction (right direction of FIG. 7) of the incident light with respect to the illumination spot BS on the surface of the sample W when viewed from above is referred to as a front side, and the opposite direction (left direction of FIG. 7) is referred to as a rear side. With respect to the illumination spot BS, a lower side of FIG. 7 is a right side and an upper side is a left side. An angle θ formed by a detection optical axis (a center line of the detection aperture) of each of the detection optical systems B1 to B13 with respect to a normal line N (FIG. 8) of the sample W passing through the illumination spot BS is referred to as a detection zenith angle. In a plane parallel to the surface of the sample W, an angle φ (FIGS. 9 and 10) formed by the detection optical axis (center line of the detection aperture) of each of the detection optical systems B1 to B13 with respect to the incidence plane of the oblique incidence illumination in a plan view is described as a detection azimuth angle.

As illustrated in FIGS. 7 to 10, the objective lenses of the detection optical systems B1 to B13 are arranged along an upper half hemispherical surface of a sphere (celestial sphere) centered on the illumination spot BS with respect to the sample W. Detection apertures L1 to L6, H1 to H6, and V of the detection optical systems B1 to B13 are arranged along the hemispherical surface, and the scattered light collected by the detection apertures L1 to L6, H1 to H6, and V is condensed by the corresponding detection optical systems B1 to B13. The detection apertures of the detection optical systems shown in FIGS. 8 to 10 are denoted by reference signs L1 to L6 and H1 to H6.

The detection aperture V has its aperture overlapping the zenith, and is positioned directly above the illumination spot BS formed on the surface of the sample W (detection zenith angle $\varphi^2 = 0°$).

The detection apertures L1 to L6 have their apertures positioned at low angles so as to equally divide an annular region surrounding the illumination spot BS 360 degrees. The detection zenith angles $\varphi^2$ of these low-angle detection apertures L1 to L6 are 45° or larger. The detection apertures L1 to L6 are arranged in the order of the detection apertures L1, L2, L3, L4, L5, and L6 counterclockwise from the incident direction in the oblique incidence illumination as viewed from above. The detection apertures L1 to L6 are laid out so as to avoid the incident optical path in the oblique incidence illumination. The detection apertures L1 to L3 are disposed at the right side with respect to the illumination spot BS. The detection aperture L1 is positioned at a right rear side of the illumination spot BS, the detection aperture L2 is positioned at the right side, and the detection aperture L3 is positioned at a right front side. The detection apertures L4 to L6 are disposed at the left side with respect to the illumination spot BS. The detection aperture L4 is positioned at a left front side of the illumination spot BS, the detection aperture L5 is positioned at the left side, and the detection aperture L6 is positioned at a left rear side. For example, the detection azimuth angle φ1 of the front detection aperture L3 is set to 0° to 60°, the detection azimuth angle φ1 of the lateral detection aperture L2 is set to 60° to 120°, and the detection azimuth angle φ1 of the rear detection aperture L1 is set to 120° to 180°. The arrangement of the detection apertures L4, L5, and L6 is bilaterally symmetrical to the detection apertures L3, L2, and L1 with respect to the incidence plane in the oblique incidence illumination.

The detection apertures H1 to H6 have their apertures positioned at high angles (between the detection apertures L1 to L6 and the detection aperture V) so as to equally divide an annular region surrounding the illumination spot BS 360 degrees. The detection zenith angles $\varphi^2$ of these high-angle detection apertures H1 to H6 are 450 or smaller. The detection apertures H1 to H6 are arranged in the order of the detection apertures H1, H2, H3, H4, H5, and H6 counterclockwise from the incident direction in the oblique incidence illumination as viewed from above. Among the detection apertures H1 to H6, the detection aperture H1 is positioned at the rear side of the illumination spot BS, and the detection aperture H4 is positioned at the front side of the illumination spot BS. The detection apertures H2 and H3 are disposed at the right side with respect to the illumination spot BS, the detection aperture H2 is positioned at the right rear side of the illumination spot BS, and the detection aperture H3 is positioned at the right front side. The detection apertures H5 and H6 are disposed at the left side with respect to the illumination spot BS, the detection aperture H5 is positioned at the left front side of the illumination spot BS, and the detection aperture H6 is positioned at the left rear side. In this example, the detection azimuth angles $\varphi1$ of the high-angle detection apertures H1 to H6 are shifted by 30 degrees with respect to those of the low-angle detection apertures L1 to L6.

The scattered light scattering in various directions from the illumination spot BS is incident on the detection apertures L1 to L6, H1 to H6, and V, is condensed by the detection optical systems B1 to B13, and is guided to the corresponding sensors C1 to Cn.

FIG. 11 is a schematic diagram illustrating an extracted example of a configuration of the detection optical system. In the defect inspection device of the embodiment, each of the detection optical systems B1 to B13 (or some of the detection optical systems) is configured like the detection optical system Bn shown in FIG. 11, and the polarization direction of the illumination scattered light to be transmitted can be controlled by a polarization plate Bb. Specifically, the detection optical system Bn includes an objective lens (condensing lens) Ba, a wave plate Bb, a polarization beam splitter Bc, and imaging lenses (tube lenses) Bd and Bd' and field diaphragms Be and Be'.

The scattered light incident on the detection optical system Bn from the sample W is condensed and collimated by the objective lens Ba, and the polarization direction thereof is controlled by the wave plate Bb. The wave plate Bb is a half-wave plate and is rotatable by a driving mechanism (not shown). The control device E1 controls the driving mechanism to adjust a rotation angle of the polarization plate Bb, thereby controlling the polarization direction of the illumination scattered light to be incident on the sensor.

The illumination scattered light subjected to polarization control by the wave plate Bb is split into branch optical paths by the polarization beam splitter Bc according to the polarization direction, and is incident on the imaging lenses Bd and Bd'. The combination of the wave plate Bb and the polarization beam splitter Bc cuts a linearly-polarized component in any direction. When cutting any polarized component including elliptically polarized light, the wave plate Bb is implemented by a quarter-wave plate and a half-wave plate that are rotatable independently of each other.

The scattered illumination light condensed after passing through the imaging lens Bd is photoelectrically converted by the sensor Cn through the field diaphragm Be, and a detection signal thereof is input to the signal processing device D. The scattered illumination light condensed after passing through the image forming lens Bd' is photoelectrically converted by the sensor Cn' through the field diaphragm Be', and a detection signal thereof is input to the signal processing device D. The field diaphragms Be and Be' are installed such that centers thereof are aligned with the optical axis of the detection optical system Bn, and cuts light occurring from a position other than the position to be inspected, such as light occurring from a position away from the center of the illumination spot BS of the sample W, or stray light occurring inside the detection optical system Bn. Accordingly, an effect of further reducing the noise that interferes with defect detection is exhibited.

According to the above configuration, two polarized components orthogonal to each other of the scattered light can be simultaneously detected, and it is effective to detect a plurality of types of defects having different polarization characteristics of the scattered light.

In order to efficiently detect the scattered light by the sensors Cn and Cn', it is preferable that the objective lens Ba has a numerical aperture (NA) of 0.3 or more. When the objective lens Ba is implemented by a plurality of densely arranged lenses, in order to reduce the loss in the amount of detected light due to a gap between the lenses, an outer peripheral portion of the objective lens Ba may be cut out so as not to interfere with the sample W or other objective lenses as in the example in FIG. 11.

Sensor

The sensors C1 to Cn and C1' to Cn' are sensors that convert the illumination scattered light condensed by the corresponding detection optical systems into an electric signal and output a detection signal. The sensors C1 (C1'), C2 (C2'), C3 (C3'), and so on correspond to the detection optical systems B1, B2, B3, and so on. As the sensors C1 to C13', a single-pixel point sensor such as a photoelectron multiplier or a silicon photoelectron multiplier (SiPM) that photoelectrically converts a weak signal with a high gain can be used. In addition, a sensor in which a plurality of pixels are arranged one-dimensionally or two-dimensionally may be used as the sensors C1 to Cn, such as a CCD sensor, a CMOS sensor, and a position sensing detector (PSD). The detection signals output from the sensors C1 to C13' are input to the signal processing device D as needed.

Control Device

The control device E1 is a computer that integrally controls the defect inspection device 100, and includes a CPU, an FPGA, a timer, and the like in addition to a ROM, a RAM, and other storage devices. The control device E1 is connected to the input device E2, the monitor E3, and the signal processing device D in a wired or wireless manner. The input device E2 is a device by which a user inputs settings of inspection conditions and the like to the control device E1, and various input devices such as a keyboard, a mouse, and a touch panel can be appropriately adopted. To the control device E1, an output of an encoder of the rotary stage or the translation stage ($r\theta$ coordinates of the illumination spot BS on the sample), an inspection condition input by an operator via the input device E2, and the like are input. In addition to a type, a size, a shape, material, an illumination condition, a detection condition, and the like of the sample W, the inspection condition includes, for example, a sensitivity setting of each of the sensors C1 to C13', a gain value and a threshold used for defect determination, and a setting (central angle $\alpha$ and the like) of a determination region JA (described later). When the sample W is scanned by the rotary scanning system, a difference occurs in a detection channel depending on $\theta$ coordinates on the sample as described later. The gain value, the threshold, and the like can be set according to the $\theta$ coordinates and in-die coordinates in consideration of the $\theta$ coordinate dependency. The detection channel is typically output signals of the sensors C1 to C13', and may include a subset of the output signals of the sensors C1 to C13', or a signal obtained by performing a weighted addition process on the output signals of the sensors C1 to C13' or the subset. When setting the gain value and the threshold according to the $\theta$ coordinates and the in-die coordinates, the gain value and the threshold change in a rotation period of the sample W for each detection channel.

Further, the control device E1 outputs an instruction signal for instructing the operation of the stage ST, the illumination optical system A, and the like according to the inspection condition, and outputs coordinate data of the illumination spot BS synchronized with a detection signal of a defect to the signal processing device D. The control device E1 also displays and outputs an inspection condition setting screen and inspection data (an inspection image and the like) of the sample on the monitor E3. The inspection data can indicate not only a final inspection result obtained by integrating the signals of the sensors C1 to C13' but also individual inspection results obtained by the sensors C1 to C13'. On the inspection condition setting screen, a setting portion for setting the gain value, the threshold, and the like according to the θ coordinates for each detection channel can be displayed.

As illustrated in FIG. 1, a defect review-scanning electron microscope (DR-SEM), which is an electron microscope for defect inspection, may be connected to the control device E1. In this case, data on a defect inspection result from the DR-SEM can be received by the control device E1 and transmitted to the signal processing device D.

Signal Processing Device

The signal processing device D is a computer that processes detection signals input from the sensors C1 to Cn. Similarly to the control device E1, the signal processing device D includes a memory D1 (FIG. 20) including at least one of a RAM, a ROM, an HDD, an SSD, and other storage devices, and an appropriate calculation processing device such as a CPU, a GPU, and an FPGA. The signal processing device D can be implemented by a single computer that forms a unit with a device main body (the stages, the illumination optical systems, the detection optical systems, the sensors, and the like) of the defect inspection device 100, and can be implemented by a plurality of computers that are connected by a network. For example, a configuration may be adopted in which a computer attached to the device main body acquires a detection signal of a defect from the device main body, processes the detection data as necessary, and transmits the processed detection data to a server, and the server performs processing such as defect detection and classification.

Difference in Scattering Direction Due to Sample Angle

FIG. 12 is a schematic diagram illustrating a relationship between an emission direction of pattern diffracted light and an angle of the sample. On the surface of the sample W which is a patterned semiconductor wafer, a rectangular pattern mainly having longitudinal and transverse directions (x direction and y direction) as a longer direction in an xy orthogonal coordinate system on the sample W, or a pattern in which microstructures are arranged in the longitudinal and transverse directions is formed. When such a sample W is illuminated with the illumination light, a large amount of scattered light and diffracted light (pattern light) from the patterns is detected, and becomes noise for defect detection. Therefore, in order to inspect the defect of the sample W with high sensitivity, it is effective to prevent the detection of the pattern light and to restrict the influence of the detection of the pattern light in the signal processing of determining a defect. In particular, since the intensity of the diffracted light is higher than that of the scattered light, it is effective to take measures against the diffracted light from the pattern and a detection signal thereof.

FIG. 12 illustrates a linear (rectangular) pattern Px extending in the x direction and a linear (rectangular) pattern Py extending in the y direction as typical examples of the pattern. In the case of the oblique incidence illumination, since the detection optical system serves as a dark field optical system in which regularly reflected light reflected at a low angle on the surface of the sample W is not detected due to a positional relationship between the illumination optical system A and the sensors C1 to C13' (detection aperture L1 and the like) (FIG. 9), light reflected on flat portions (upper surfaces) of the patterns Px and Py is hardly detected. Therefore, it is not necessary to consider the reflected light occurring at the flat portions of the patterns Px and Py, and it is sufficient to consider the diffracted light occurring from edges of the patterns Px and Py. The diffracted light occurring from the edges of the patterns Px and Py is emitted in a generatrix direction of a cone having the illumination spot BS as the apex as illustrated in FIG. 12. The emission direction of the diffracted light is different between the pattern Px and the pattern Py. When orientations of the patterns Px and Py with respect to the illumination light in the oblique incidence illumination change with the rotation of the sample W, the emission direction of the diffracted light also changes accordingly.

Incident points of the diffracted light illustrated in FIG. 12 with respect to the detection apertures L1 to L6, H1 to H6, and V of the respective detection optical systems B1 to B13 are distributed on a line of intersection between a spherical surface (the hemispherical surface on which the detection aperture L1 and the like are arranged) centered on the irradiation spot BS and a conical surface formed by traveling directions of the diffracted light. FIG. 13 illustrates a projection of the line of intersection onto the xy plane (a horizontal plane passing through the illumination spot BS). The distribution of the incident points of the diffracted light illustrated in FIG. 13 is a linear shape at a distance R ($=\sin\varphi 2$) from the illumination spot BS, which is calculated using the azimuth angle $\varphi 1$ and the zenith angle $\varphi 2$ that define the emission directions of the diffracted light from the patterns Px and Py with a radius of the hemispherical surface as a unit distance.

In the xy coordinate system of the sample W, the distribution of the incident points of the diffracted light is equivalent to a shape obtained by Fourier transforming a linear shape of the light source (pattern edge in this example) based on the microstructures overlapping the illumination spot BS. An origin of the frequency of the Fourier transform is a projection point on the xy plane of the incident point of the regularly reflected light on the hemispherical surface in the oblique incidence illumination. Since the pattern Px is uniform in the x direction on the xy plane and in a delta function shape in the y direction, the distribution of the incident points of the diffracted light is in the delta function shape in the x direction and uniform in the y direction. That is, the distribution of the incident points of the diffracted light occurring at the edge of the pattern Px is a linear distribution extending in the y direction through the incident points (projection points) of the regularly reflected light on the xy plane. When the illumination spot BS extends over a plurality of patterns Px periodically arranged side by side in the y direction, the distribution of the diffracted light in the y direction is a periodic (intermittent) distribution obtained by Fourier transforming the distribution of the diffracted light, and is included in the linear distribution of the diffracted light illustrated in FIG. 13. The same applies to the distribution of the incident points of the diffracted light occurring at the edge of the pattern Py, and the distribution is a linear distribution that extends in the x direction and intersects (in this example, is orthogonal to) the distribution straight line of the diffracted light of the pattern Px at the incident points (projection points) of the regularly reflected light on the xy plane.

During the inspection, the orientations of the patterns Px and Py overlapping the illumination spot BS change with the rotation of the sample W, and the distribution of the incident points of the diffracted light obtained by Fourier transforming edge shapes of the patterns Px and Py also rotates around the incident points of the regularly reflected light according to the rotation of the sample W. Therefore, the distribution of the diffracted light also rotates by the same angle as the rotation angle of the sample W.

FIGS. 14 and 15 are schematic diagrams illustrating a change in the emission direction of the diffracted light due to the rotation angle of the sample with respect to the illumination light. In the sample W, a large number of dies d formed with the same pattern in design are arranged in the xy directions (in matrix). As a method of inspecting a patterned wafer, a method of comparing detection signals of portions, where the same pattern is formed, on a plurality of dies d (typically, adjacent dies) has been known. In the example in FIG. 14, when performing the inspection by setting a predetermined portion of a predetermined die d as an inspection portion IS, for example, a portion having the same in-die coordinates as the inspection portion IS in an adjacent die d is set as a comparison portion CS, and detection signals of the inspection portion IS and the comparison portion CS can be compared. It is assumed that the same signal can be obtained if both the inspection portion IS and the comparison portion CS have a normal pattern. Accordingly, when a difference between the detection signals of the inspection portion IS and the comparison portion CS is less than a threshold, it can be determined that the detection signal of the inspection portion IS is a detection signal of a normal pattern. When the difference between the detection signals of the inspection portion IS and the comparison portion CS is equal to or greater than the threshold, it can be determined that the detection signal of the inspection portion IS may be a detection signal of a defect.

When the orientation of the sample W changes with the rotary scanning, the orientation of the sample W with respect to the illumination light at the time when the comparison portion CS is scanned may change with respect to the orientation at the time when the inspection portion IS is scanned as illustrated in FIG. 14. As illustrated in FIGS. 14 and 15, when the orientation of the sample W with respect to the illumination light is different, emission directions of the diffracted light occurring at the inspection portion IS and the diffracted light occurring at the comparison portion CS change, and the detection apertures on which the diffracted light is incident change (right parts of FIGS. 14 and 15). Accordingly, the intensity of the output signal of each of the sensors C1 to C13' changes, and the inspection cannot be appropriately performed even if signals of the same sensor are compared with each other for the inspection portion IS and the comparison portion CS.

In contrast, FIGS. 16 and 17 are schematic diagrams illustrating a typical example in which the emission directions of the diffracted light of the inspection portion IS and the comparison portion CS are substantially the same. The left part of FIG. 16 illustrates a state in which the illumination light is incident on any inspection portion IS of the sample W. The left part of FIG. 17 illustrates a state in which the illumination light is incident on the comparison portion CS having the same θ coordinate as the inspection portion IS and different r coordinate from the inspection portion IS in the sample W. That is, the inspection portion IS and the comparison portion CS illuminated with the illumination light in FIGS. 16 and 17 are positioned on the same straight line Lr passing through the center point of the sample W and extending in the r direction. Here, it is assumed that the inspection portion IS and the comparison portion CS have the same in-die coordinates. In a case where the rotation angles of the sample W shown in FIGS. 16 and 17 are the same, the shape and orientation of the pattern on which the illumination light is to be incident are the same or equivalent between the inspection portion IS and the comparison portion CS, and the illumination light is incident on the patterns formed on both portions in the same manner for the illumination light. Therefore, when both the inspection portion IS and the comparison portion CS are normal portions having no defect, diffracted light having substantially the same azimuth angle φ and intensity occurs from the inspection portion IS and the comparison portion CS. As a result, as illustrated in the right parts of FIGS. 16 and 17, substantially the same light is similarly incident on each of the detection apertures L1 to L6, H1 to H6, and V.

Setting of Comparison Portion

In the embodiment, a plurality of portions having the same or equivalent surface structure (pattern layout or the like) are compared so that a normal pattern formed on the surface of the sample W is not erroneously detected as a defect. At this time, for any inspection portion IS on the surface of the sample W, the signal processing device D extracts, as the comparison portion CS, a portion whose θ coordinates are in a set correspondence relationship in an rθ circular coordinate system in which the center point of the sample W (the rotation center of the sample stage ST1) is set as the origin. Then, the detection signal from the inspection portion IS is compared with the detection signal from the comparison portion CS, and the defect inspection of the sample W is performed based on the difference between the detection signals.

FIG. 18 is an illustrative diagram of the correspondence relationship between the θ coordinates of the inspection portion and the comparison portion in the embodiment. A die or a part thereof, or a shot can be set as the unit of the size of the inspection portion and the comparison portion. In the embodiment, as illustrated in FIG. 18, a case where the die d is set as the unit of the inspection portion IS and the comparison portion CS will be described as an example. The inspection portion IS and the comparison portion CS have a positional relationship in which the θ coordinates thereof correspond to each other in the rθ circular coordinate system on the sample W. In FIG. 18, the die d exemplified as the inspection portion IS is hatched, and the die d that can be taken as the comparison portion CS with respect to the inspection portion IS is shaded.

In the embodiment, whether the inspection portion IS and the comparison portion CS are in a positional relationship in which the θ coordinates thereof correspond to each other is determined with reference to a strip-shaped determination region JA passing through the center of the sample W. The determination region JA in the embodiment is a region surrounded by a thick-bordered box in FIG. 18, and is a strip-shaped region (a sector having a central angle α) sandwiched between two straight lines extending in the radial direction of the sample W with the center point of the sample W as a starting end. For example, when the inspection portion IS and the comparison portion CS overlap the same determination region JA, that is, when a difference in the θ coordinates between the inspection portion IS and the comparison portion CS is approximately equal to or less than the central angle α, it can be determined that the inspection portion IS and the comparison portion CS have the positional relationship in which the θ coordinates thereof correspond to each other. The central angle α can be set as one item of the inspection condition, and the comparison accuracy of the inspection portion IS and the comparison portion CS is improved by setting the central angle α to be small (for example, setting to several degrees). By setting the central angle α to be large (for example, setting to about a dozen degrees to two dozen degrees), the number of comparison portions CS that can be compared with the inspection portion IS increases.

It is also possible to set a determination algorithm for determining whether the inspection portion IS and the comparison portion CS overlap the same determination region JA. For example, the algorithm can be constructed such that the θ coordinates of the determination region JA are set to overlap the entire inspection portion IS, and at least one die d, the entire of which overlaps the determination region JA, is extracted as the comparison portion CS. In this case, an angle difference between the θ coordinates of the inspection portion IS and the comparison portion CS is reduced, and the comparison accuracy is increased. For example, the algorithm can be set such that the θ coordinates of the determination region JA are set to overlap a part of the inspection portion IS, and at least one die d, which at least partially overlaps the determination region JA, is extracted as the comparison portion CS. In this case, although the angle difference between the θ coordinates of the inspection portion IS and the comparison portion CS may increase, there is an advantage that the number of comparison objects increases. In addition, an algorithm of extracting, as the comparison portion CS, the die d a part of which overlaps the determination region JA that overlaps the entire inspection portion IS and an algorithm of extracting, as the comparison portion CS, the die d the entire of which overlaps the determination region JA that overlaps a part of the inspection portion IS may be considered.

The inspection portion IS and the comparison portion CS can be selected from a plurality of dies d whose θ coordinates are in a set correspondence relationship in the same sample W, and can also be extracted from different samples W. For example, data of a signal obtained by scanning, in the same manner as for the sample W, another inspection sample or standard sample (specimen) of the type same as or equivalent to that of the sample W to be inspected is stored. A storage destination may be the signal processing device D or the storage device DB (FIG. 1) connected to the signal processing device D. As described above, a mode is also conceivable in which data of the comparison portion CS having the positional relationship in which the θ coordinates thereof correspond to the θ coordinates of any inspection portion IS of the sample W is extracted from data obtained from a different sample that is the same type as the sample to be inspected, and data of the inspection portion IS and the comparison portion CS is compared.

In addition, it is also effective to configure the signal processing device D to extract the comparison portion CS from a region RA in which the difference in r coordinates from the inspection portion IS is equal to or less than a set value. That is, it is more preferable that the comparison portion CS is extracted from a region (a region where the determination region JA and the region RA overlap) in which the θ coordinates of the inspection portion IS and the comparison portion CS are in a set correspondence relationship and the difference in the r coordinates is equal to or less than a set value.

Collection of Comparison Data (Option)

As described above, in the embodiment, a defect of the sample W is inspected by comparing any inspection portion IS with a comparison portion CS that is in a predetermined positional relationship with the inspection portion IS. In this case, typically, it is conceivable to store data of the entire surface of the sample W, and extract data of the inspection portion IS and the comparison portion CS from the data of the entire surface and make a comparison. However, since the data of the entire surface of the sample W is large, depending on the processing capacity of the signal processing device D, it may be difficult to execute defect inspection processing in the inspection time of one sample W while collecting data in parallel with the scanning of the sample W. In such a case, it is conceivable that the sample W or a substitute sample is scanned in advance to collect the comparison data, and the data of the comparison portion CS is extracted from the comparison data to be used for the inspection of the inspection portion IS. When inspecting the sample W by the oblique incidence illumination, it is desirable to acquire the comparison data by the oblique incidence illumination, and when inspecting the sample W by vertical illumination, it is desirable to acquire the comparison data by the vertical illumination.

As the sample used for collecting the comparison data, the same type of sample as the sample W (including the sample W to be inspected later) or a sample equivalent to the sample W can be used. The same type of sample as the sample W is a sample having the same surface structure (pattern design or the like) over the entire surface as the sample W. The sample equivalent to the sample W is a sample that has a surface structure partially different from that of the sample W and includes, at a predetermined ratio or more, a portion having the same in-sample coordinates and surface structure as the sample W. It is desirable that the same type of sample as the sample W or the sample equivalent to the sample W is a sample in the same process as the sample W to be inspected (a sample at the same stage in the manufacturing process). Although the collection processing of the comparison data can be performed using one sample, it is preferable to integrate data of a plurality of samples in order to acquire more reliable comparison data.

FIG. 19 is a functional block diagram illustrating an example of processing of advance acquisition of the comparison data. In the embodiment, a case where the collection processing of the comparison data is executed by the signal processing device D will be described as an example, and the collection processing of the comparison data may be separately executed by a computer different from the signal processing device D.

The processing of collecting the comparison data includes processing of sampling f1, down-sampling f2, and statistics collection f3. The sampling f1 includes low-frequency component sampling f1a and high-frequency component sampling fib. The series of processing of the sampling f1, the down-sampling f2, and the statistics collection f3 is executed for each of detection channels Ch1, Ch2, ChN in the signal processing device D. As described above, the detection channels Ch1 to ChN are typically the individual output signals of the sensors C1 to C13', and may include a synthesized signal of the subset of the output signals of the sensors C1 to C13' instead of or in addition to a part or all of the signal output. By synthesizing the output signals of the plurality of sensors and handling the output signals as one output, the processing amount and storage amount of data can be reduced, and the SN ratio can be increased by adding up weak defect signals.

Low-Frequency Component Sampling f1$a$

In the processing of the low-frequency component sampling f1$a$, the signal processing device D executes frequency filtering (low-pass filtering) processing for each of the detection channels Ch1 to ChN, and extracts a component having a low variable frequency including a stationary component. The component having a low variable frequency is a component in which a variation in output value over time is less than a set value set in advance. By the processing of the low-frequency component sampling f1$a$, a detection signal of light occurring in a region where no pattern is formed or on a flat surface of a relatively wide pattern is extracted.

High-Frequency Component Sampling f1$b$

In the processing of the high-frequency component sampling fib, the signal processing device D executes frequency filtering (high-pass filtering) processing for each of the detection channels Ch1 to ChN, and extracts a component having a high variable frequency. The component having a high variable frequency is a component in which a variation in output value over time exceeds a set value set in advance. By the processing of the high-frequency component sampling fib, a detection signal of light occurring at a defect, an isolated pattern, a boundary of a pattern region, and a pattern edge, random noise, and the like are extracted.

Down-Sampling f2

In the processing of the down-sampling f2, the signal processing device D thins out data according to the rd coordinates. Specifically, for example, a method of extracting a representative value (an average value, a median value, a mode value, or the like) in each of small regions obtained by partitioning the sample surface at a fixed pitch in the r direction and the θ direction in the rθ coordinate system and accordingly thinning out data can be exemplified. Although the down-sampling f2 is effective in shortening the time of the collection processing of the comparison data and reducing the data amount, the processing of the down-sampling f2 is unnecessary when there is no restriction on the time and data amount of the collection processing of the comparison data.

Statistics Collection f3

In the processing of the statistics collection f3, the signal processing device D totalizes signals for each detection channel to collect statistics, and calculates background brightness, expected brightness, expected variation, and the like for each detection channel for each rθ coordinate. The background is a place estimated to be a portion other than a defect, such as a wafer surface roughness without a pattern or a normal pattern on the sample surface, and the background brightness is the intensity (brightness) of a signal related to light occurring at the background. Accordingly, the background brightness includes not only the intensity of a low-frequency component signal but also the intensity of a high-frequency component signal. The background brightness and the like vary depending on the position on the sample surface, and may vary in the same die.

Calculation of the background brightness, the expected brightness, and the expected variation in the processing of the statistics collection f3 will be described.

First, for each detection channel, the signal extracted by the processing of the low-frequency component sampling f1$a$ is classified as low-frequency background brightness, and the signal extracted by the processing of the high-frequency component sampling flb is classified as high-frequency background brightness. For each detection channel, the background brightness is recorded in the memory D1 together with the rθ coordinates and the in-die coordinates on the sample W from which the signal is obtained.

Next, for each detection channel, a group of background brightness of portions whose θ coordinates coincide (or the difference is within a set range) in the rθ circular coordinate system of the sample and the in-die coordinates coincide (or the difference is within a set range) is extracted. Then, for each detection channel, a representative value (for example, an average value, a median value, or a mode value) of the background brightness of each group is obtained, is associated with the θ coordinates and the in-die coordinates, and is stored in the memory D1 as the expected brightness.

For each of the low-frequency background brightness and the high-frequency background brightness, data is extracted for each in-die coordinate (or for each region in the die), and the variance or standard deviation of the extracted data is obtained and stored in the memory D1 as the expected variation.

Here, the high-frequency background brightness may include data of a signal generated at a defect on the surface of the sample. Preferably, the brightness of such a defect candidate is excluded from the high-frequency background brightness, and the expected brightness and the expected variation are calculated based on the background brightness not including the brightness of the defect candidate. When the brightness of the defect candidate is excluded, for example, a group of background brightness of portions whose θ coordinates coincide (or the difference is within the set range) and the in-die coordinates coincide (or the difference is within the set range) is extracted from the data of the entire surface of the sample, and an average value of each group is calculated. Then, in each group, the background brightness whose deviation from the average value exceeds a set value is determined as the brightness of the defect candidate, and is distinguished from the data of the high-frequency background brightness. The distinguished brightness of the defect candidate can also be recorded in the memory D1.

However, unless the number of defects is extremely large, a ratio of the number of pieces of data on the defect to the number of pieces of data on the entire surface of the sample is generally small. When the influence on values of the expected brightness and the expected variation due to the data on the defect being included is small, the processing of excluding the data on the defect from the high-frequency background brightness may be omitted.

The comparison data acquired as described above, that is, the background brightness, the expected brightness, the expected variation, and the like can be displayed on the monitor E3, for example, according to an operation on the input device E2. In this case, the comparison data can be displayed as distribution display on the sample or in a selected die by graphics using color, shading, equal lines, or the like, or can be displayed in the form of a histogram, a frequency distribution table, or the like.

Defect Inspection

FIG. 20 is a functional block diagram illustrating a procedure of defect inspection executed by the signal processing device D. The processing executed by the signal processing device D at the time of defect inspection includes processing of SN ratio adjustment F1, filtering F2, comparison F3, and determination F4.

SN Ratio Adjustment F1

The processing of the SN ratio adjustment F1 is executed according to the in-die coordinates (the θ coordinates of the illumination spot BS) for the detection signal of each detection channel. In the SN ratio adjustment F1 of the embodiment, weighted addition processing is performed on each of the detection channels Ch1, Ch2, to ChN, and addition detection channels Ch1', Ch2', to ChN' are calculated. Here, a method using a gain table can be exemplified as an example of the weighted addition processing. The gain table is two-dimensional table data having a gain value g (weighting factor) of each of the detection channels Ch1 to ChN for each of the addition detection channels Ch1' to ChN'. Using the gain table, the signal processing device D performs addition by multiplying the detection channels Ch1 to ChN by the gain value g and calculates the addition detection channels Ch1' to ChN'.

Regarding the setting of the gain value g, a method of reducing a weight count to be smaller as the detection channel has a larger variation in the background brightness of the comparison data is exemplified as an example. At this time, it is desirable that the gain value g is set based on an expected value of defect candidate brightness, and an appropriate dynamic range is secured such that there is no occurrence of lost of information on a defect intensity signal due to saturation of the addition channel or occurrence that the defect is not detected due to a too weak addition channel. Further, if an expected value of the background brightness (low frequency or high frequency) or a value that is inversely proportional to the root of the square is set as the gain value g for each detection channel, noise after the weighted addition is equalized among the addition detection channels, which is effective for high-sensitivity inspection.

A plurality of gain tables different in the $\theta$ coordinates and the in-die coordinates can be set based on the comparison data. The gain value g for each detection channel according to the $\theta$ coordinates and the in-die coordinates is set on an inspection condition setting screen displayed on the monitor E3, for example, together with the threshold, sensor sensitivity, and the like used in the processing of the filtering F2. The set gain table is recorded in, for example, the memory D1.

Filtering F2

In the processing of the filtering F2, the signal processing device D executes frequency filtering (high-pass filtering) processing for each of the addition detection channels Ch1' to ChN', and extracts a component having a high variable frequency and a high possibility of being a signal from a defect. The component having a high variable frequency is a component in which a variation in output value over time exceeds a set value set in advance. In the embodiment, only components exceeding a threshold are further extracted from the extracted high-frequency addition detection channels Ch1' to ChN'. As the threshold used at that time, different values can be applied according to the $\theta$ coordinates or the in-die coordinates for each addition detection channel based on the comparison data. For example, a lower limit of values that can be taken by the detection signal of the scattered light from the defect can be obtained based on an expected variation of the defect candidate brightness or the background brightness for each $\theta$ coordinate and the in-die coordinate of each detection channel, and can be set as the threshold for each addition detection channel and each coordinate. Although such threshold processing is effective in reducing the processing data of the defect inspection, the threshold processing may be omitted when there is a margin in the processing capacity of the signal processing device D.

Comparison F3

In the processing of the comparison F3, for each of the addition detection channels Ch1' to ChN', the signal processing device D extracts, from the comparison data, data of the comparison portion CS having the $\theta$ coordinates and the in-die coordinates corresponding to those of any inspection portion IS on the surface of the sample W. In the embodiment, the inspection portion IS is any die d formed on the sample W, and the comparison portion CS is a die whose $\theta$ coordinates are in a set correspondence relationship with those of the inspection portion IS (FIG. 18) in the sample from which the comparison data is acquired. It is more preferable that the comparison portion CS is extracted from a region where a difference in r coordinates from the inspection portion IS is equal to or less than a set value.

The signal processing device D compares the data of the comparison portion CS extracted in this manner and the data of the inspection portion IS, and performs a determination about a defect of the inspection portion IS. The presence or absence of a defect can be determined based on whether a difference between the data of the inspection portion IS and the data of the inspection portion IS exceeds a threshold set in advance. The threshold used for the comparison F3 can be set in the signal processing device D, for example, by calculating an upper limit of values that can be taken by a detection signal generated at a portion other than a defect (normal pattern or the like), from the comparison data (expected brightness or expected variation) corresponding to the $\theta$ coordinates or the in-die coordinates of the inspection portion IS. In addition, a method of setting a threshold to a lower limit of a variation range of the defect candidate brightness and leaving a signal exceeding the threshold as a signal related to a defect can be applied. In the processing of the comparison F3, a signal determined as a signal from a defect is extracted for each of the addition detection channels Ch1 to ChN'.

Determination F4

In the processing of the determination F4, the signal processing device D integrates the addition detection channels Ch1' to ChN' determined to be signals from defects through the processing of the comparison F3, and performs a final defect determination. The defect determination processing can be executed by, for example, calculating a logical sum of determination results (truth values) of a plurality of addition detection channels or performing processing of majority decision (voting) based on comparison results of the plurality of addition detection channels. In comparison processing of a plurality of addition detection channels, a numerical value corresponding to a probability that a defect candidate signal is a defect is output, and a total sum, an average, or the like of numerical values is calculated, whereby the defect determination processing can be executed. The processing result of the determination F4 can be displayed on the monitor E3 by, for example, operating the input device E2.

Effects (1) Any inspection portion IS on the surface of the sample W is inspected by comparison with the comparison portion CS whose $\theta$ coordinates are in a set correspondence relationship with those of the inspection portion IS in the $r\theta$ circular coordinate system. Since the inspection portion IS and the comparison portion CS have the same angle with respect to the illumination light at the time of scanning, the validity of the inspection result obtained by the comparison processing of both portions can be secured even in the rotary scanning system. Accordingly, the sample W having the fine structures (patterns) repeatedly formed on the surface thereof can be accurately inspected by the rotary scanning system. Since the sample W such as a patterned wafer which has been inspected by the XY scanning system for the fine structures formed on the surface can be inspected by the rotary scanning system, the throughput can be greatly improved. For example, compared with the XY scanning system, the inspection time per sample can be reduced to half or less.

(2) The comparison data can be collected in advance from the sample of a type same as or equivalent to that of the sample W to be inspected, and data of the comparison portion CS can be extracted from the comparison data and used for the inspection of the inspection portion IS, whereby the sample W can be efficiently inspected. In addition, by acquiring the comparison data such as the background brightness from a plurality of samples, it is possible to reduce the influence of the individual difference of the samples and the random noise on the comparison data such as the background brightness, and it is possible to acquire the comparison data having higher reliability.

(3) Although it is ideal that the θ coordinates of the inspection portion IS and the comparison portion CS coincide with each other, it may be unable to extract the comparison portion CS having the θ coordinates completely coinciding with those of the inspection portion IS if the die d is the unit. In this case, as described with reference to FIG. 18, the determination region JA having a strip shape (fan shape) is set, and the correspondence relationship in the θ coordinates with the inspection portion IS is defined based on the central angle α, whereby the comparison portion CS for which a certain degree of validity is secured can be extracted as a comparison object.

(4) Further, the comparison accuracy is further improved by extracting the comparison portion CS from the region RA where the difference in r coordinates from the inspection portion IS is equal to or less than a set value. This is because portions located close to each other in the radial direction tend to have similar quality of conformance of the pattern.

Second Embodiment

FIG. 21 is a functional block diagram illustrating a procedure of defect inspection of a defect inspection device according to a second embodiment of the invention. FIG. 21 corresponds to FIG. 20 of the first embodiment. In FIG. 21, elements that are the same as or corresponding to the elements described in the first embodiment are denoted by the same reference signs as those in the already shown drawings, and a description thereof will be omitted.

The embodiment is different from the first embodiment in that the threshold processing is omitted in the processing of the filtering F2. In other respects, the embodiment is similar to the first embodiment.

As described above, the threshold processing in the filtering F2 is effective in reducing the processing data of the defect inspection, and may be omitted when there is a margin in the processing capacity of the signal processing device D. In the case of the embodiment, since the number of pieces of data of a defect candidate is increased as compared with the first embodiment, the detection sensitivity of a defect is improved.

In addition, the threshold processing is not simply omitted, and an algorithm for executing frequency filtering processing may be used instead of the threshold processing (see a broken line in FIG. 21).

Third Embodiment

FIG. 22 is an illustrative diagram of a correspondence relationship between θ coordinates of an inspection portion and a comparison portion which is applied to a defect inspection device according to a third embodiment of the invention. FIG. 22 corresponds to FIG. 18 of the first embodiment. In FIG. 22, elements that are the same as or corresponding to the elements described in the first embodiment are denoted by the same reference signs as those in the already shown drawings, and a description thereof will be omitted.

The embodiment is different from the first embodiment in the setting of the correspondence relationship in the θ coordinates between the comparison portion CS and the inspection portion IS. Specifically, in the first embodiment, the difference in the θ coordinates between the comparison portion CS and the inspection portion IS is limited to a predetermined value (the central angle α of the determination region JA) or less, and the inspection portion IS and the comparison portion CS being in the same direction as viewed from the center of the sample W is set as a condition. In contrast, in the embodiment, the determination region JA is also enlarged to the opposite side across the center of the sample W. In other words, the determination region JA according to the embodiment is a strip-shaped region (a region in which two elongated sectors are disposed to face each other) sandwiched between two straight lines passing through the center of the sample W, and includes, in addition to a region JA1 overlapping the inspection portion IS, a facing region JA2 having θ coordinates different from those of the region JA1 by 180°. Similarly to FIG. 18, also in FIG. 22, the inspection portion IS is hatched, and dies d that can be the comparison portion CS are shaded. In other respects, the embodiment is similar to the first embodiment.

Since most of the edges of the pattern formed on the sample W extend in the X direction or the Y direction in the XY orthogonal coordinate system, an extending direction thereof does not change even when the edges are rotated by 180°. Therefore, regarding the comparison portion CS extracted from the region JA2, although an incident direction of the illumination light is rotated by 180° with respect to the inspection portion IS, since the extending direction of the pattern edge is the same, an emission direction of the diffracted light shows the same tendency. Therefore, the comparison portion CS extracted from the region JA2 can also be applied to the comparison F3 with the inspection portion IS. In the embodiment, since the region JA2 is disposed in the determination region JA in addition to the region JA1, there is an advantage that the number of comparison objects increases.

Fourth Embodiment

FIG. 23 is an illustrative diagram of a correspondence relationship between θ coordinates of an inspection portion and a comparison portion which is applied to a defect inspection device according to a fourth embodiment of the invention. FIG. 23 corresponds to FIG. 18 of the first embodiment. In FIG. 22, elements that are the same as or corresponding to the elements described in the first embodiment are denoted by the same reference signs as those in the already shown drawings, and a description thereof will be omitted.

The embodiment is different from the first embodiment in the extraction unit of the inspection portion IS and the comparison portion CS. Specifically, in the first embodiment, the inspection portion IS and the comparison portion CS are extracted on a die basis, whereas in the embodiment, a part of the die d formed on the patterned wafer is used as an extraction unit of the inspection portion IS and the comparison portion CS. It is assumed that the inspection portion IS and the comparison portion CS are parts of different dies d whose in-die coordinates correspond to each other. In other respects, the embodiment is similar to the first embodiment.

For example, in a case where dies each of which partially overlaps the determination region JA are compared with each other, a considerable number of dies in which the difference in the θ coordinates from the inspection portion IS is larger than the central angle α of the determination region JA are disposed in dies that may be the comparison portion CS due to the overlapping of the inspection portion IS and the comparison portion CS with respect to the determination region JA. As a result, there is a possibility that the difference in the θ coordinates between the extracted comparison portion CS and the inspection portion IS becomes large, or a variation in the statistical comparison data becomes large. In response, the difference in the 0 coordinates between the extracted comparison portion CS and the inspection portion IS or the variation in the statistical comparison data is restricted, and the inspection accuracy can be improved.

Also in the embodiment, the comparison portion CS may be extracted from the region JA2 opposite to the inspection portion IS across the center of the sample W as in the second embodiment.

Fifth Embodiment

FIG. 24 is an illustrative diagram of a correspondence relationship between θ coordinates of an inspection portion and a comparison portion which is applied to a defect inspection device according to a fifth embodiment of the invention. FIG. 24 corresponds to FIG. 18 of the first embodiment. In FIG. 24, elements that are the same as or corresponding to the elements described in the first embodiment are denoted by the same reference signs as those in the already shown drawings, and a description thereof will be omitted.

The embodiment is different from the first embodiment in the setting of the correspondence relationship in the 0 coordinates between the comparison portion CS and the inspection portion IS. Specifically, the determination region JA in the embodiment is defined by one straight line extending in a radial direction of the sample with the center of the sample W as a starting end. For example, a straight line (determination region JA) passing through the inspection portion IS (part of the die d in FIG. 24) is drawn from the center of the sample W, and a portion overlapping the straight line and corresponding to the inspection portion IS is extracted as the comparison portion CS. Similarly to FIG. 18, also in FIG. 24, the inspection portion IS is hatched, and dies d that can be the comparison portion CS are shaded. In other respects, the embodiment is similar to the first embodiment.

In the first embodiment, the determination region JA is defined as a sector having the central angle α. Since the determination region JA has an area, it is possible to extract, via the determination region JA, a large number of comparison portions CS whose θ coordinates are in a set correspondence relationship with those of the inspection portion IS. However, a variation in the θ coordinates of the comparison portion CS occurs.

In contrast, in the case of the embodiment, since the determination region JA is defined by a straight line, the variation in the θ coordinates of the comparison portion CS having the set correspondence relationship with the inspection portion IS is restricted via the determination region JA as compared to the first embodiment. Therefore, the accuracy of the comparison inspection can be expected to be improved from the viewpoint of extracting the comparison portion CS that is inspected under conditions closer to those of the inspection portion IS.

In the embodiment, as in the first embodiment, the comparison portion CS is extracted from a region located in the same direction as the inspection portion IS as viewed from the center of the sample W. However, the determination region JA may be defined by one straight line passing through the center of the sample W, and the comparison portion CS on the opposite side of the inspection portion IS across the center of the sample W may be extracted as in the second embodiment.

Sixth Embodiment

FIG. 25 is an illustrative diagram of a correspondence relationship between θ coordinates of an inspection portion and a comparison portion which is applied to a defect inspection device according to a sixth embodiment of the invention. FIG. 25 corresponds to FIG. 18 of the first embodiment. In FIG. 25, elements that are the same as or corresponding to the elements described in the first embodiment are denoted by the same reference signs as those in the already shown drawings, and a description thereof will be omitted.

The embodiment is different from the first embodiment in the setting of the correspondence relationship in the 0 coordinates between the comparison portion CS and the inspection portion IS. The embodiment is an example in which a part of the die d is used as an extraction unit of the inspection portion IS and the comparison portion CS as in the fourth embodiment (FIG. 23), and is different from the fourth embodiment in that a portion having different in-die coordinates from those of the inspection portion IS but having the same or corresponding design pattern is disposed in the comparison portion CS. In the embodiment, the inspection portion IS and the comparison portion CS may have the same in-die coordinates or different in-die coordinates as long as the θ coordinates thereof are in the set correspondence relationship (the relationship in any of the first to fifth embodiments). It is more preferable that the difference in R coordinates between the inspection portion IS and the comparison portion CS is equal to or less than a set value. In the embodiment, the inspection portion IS and the comparison portion CS are not limited to parts of different dies d, and may be disposed in the same die d. Similarly to FIG. 18, also in FIG. 25, the inspection portion IS is hatched, and dies d that can be the comparison portion CS are shaded. In other respects, the embodiment is similar to the first embodiment.

There is also a multi-core CPU, GPU, or the like obtained by repeatedly forming the same pattern region in the same die. When such a sample is to be inspected, a defect can be inspected more appropriately by comparing portions having different in-die coordinates as long as the 0 coordinates thereof are in a set correspondence relationship. In the case of the embodiment, comparison object data increases for any inspection portion IS, and the defect determination accuracy is improved.

Seventh Embodiment

FIG. 26 is a schematic diagram illustrating extracted main parts of a defect inspection device according to a seventh embodiment of the invention. In FIG. 26, elements that are the same as or corresponding to the elements described in the first embodiment are denoted by the same reference signs as those in the already shown drawings, and a description thereof will be omitted.

The embodiment is different from the first embodiment in that basic data of the comparison data (background brightness or the like) includes inspection data of a plurality of defect inspection devices. In the example illustrated in FIG. 26, the defect inspection device 100 is connected to the data server DS via an appropriate network (not shown). Other defect inspection devices 100' and 100" different from the defect inspection device 100 are connected to the data server DS via an appropriate network (not shown). The defect inspection devices 100, 100', and 100" are preferably the same type or equivalent type (the same series, the same manufacturer, or the like), and may be different types of devices. Although two other defect inspection devices 100' and 100" are illustrated in FIG. 26, the number of other defect inspection devices connected to the data server DS may be one or three or more.

The inspection data is input from the defect inspection devices 100, 100', and 100" to the data server DS, and the data is accumulated as big data. The accumulated big data includes inspection data of a sample for each defect inspection device, inspection conditions (inspection recipe), defect review data, design data of an inspection sample, and the like. In the data server DS, based on the big data, comparison data for each θ coordinate and each in-die coordinate is calculated for each detection channel. The calculation of the comparison data may be executed at regular intervals, or may be executed when new data is accumulated at a predetermined amount or more.

As a method of calculating the comparison data, data related to the inspection of a sample of the type same as or equivalent to that of the sample W may be extracted from the big data, and the comparison data may be calculated based on the extracted data by the algorithm described with reference to FIG. 19. In addition, for example, an AI program may be introduced into the data server DS, and comparison data such as background brightness may be automatically updated by the AI program based on the inspection data of the sample of the type same as or equivalent to that of the sample W which is extracted from the big data. In each of the defect inspection devices 100, 100', and 100", the defect inspection of the sample W is executed by the above-described algorithm (for example, FIG. 20) based on the comparison data received from the data server DS.

According to the embodiment, in addition to its own inspection data of the defect inspection device 100, the comparison data is calculated using a large amount of inspection data of the other defect inspection devices 100 and 100' as basic data, and thus there is an advantage that the inspection accuracy can be improved accompanying the accumulation of the basic data.

Eighth Embodiment

FIG. 27 is a schematic diagram illustrating extracted main parts of a defect inspection device according to an eighth embodiment of the invention. In FIG. 27, elements that are the same as or corresponding to the elements described in the first embodiment are denoted by the same reference signs as those in the already shown drawings, and a description thereof will be omitted.

The embodiment is a variation of a method of acquiring basic data of comparison data (background brightness or the like). A sample delivery position Pa, an inspection start position Pb, and an inspection completion position Pc are set on a movement axis of a translation stage of the stage ST, and a translation stage 13 is driven to move the stage ST along a straight line passing through these positions. The inspection start position Pb is a position where the inspection of the sample W is started by illuminating the sample W with the illumination light, and is a position where the center of the sample W coincides with the illumination spot BS of the illumination optical system A. The inspection completion position Pc is a position where the inspection of the sample W is completed, and in the embodiment, is a position where an outer edge of the sample W coincides with the illumination spot BS. The sample delivery position Pa is a position where the sample W is attached to and detached from (loaded onto and unloaded from) the stage ST by an arm Am, and the stage ST receiving the sample W moves from the sample delivery position Pa to the inspection start position Pb. To meet the increasing demand for high-sensitivity inspection in recent years, the detection optical systems B1 to Bn are disposed close to the sample W, and a gap G between the stage ST and the detection optical systems B1 to Bn when the stage ST is directly below the detection optical systems B1 to Bn is about several mm or less. Since it is difficult to place the sample W on the stage ST by inserting the sample W into the gap G by the arm Am at the inspection start position Pb, a configuration of delivering the sample W at the sample delivery position Pa away from the inspection start position Pb is adopted.

The scanning of the sample W by irradiating the sample with the illumination light is performed while the stage ST moves from the inspection start position Pb to the inspection completion position Pc. In the embodiment, preliminary scanning is performed while the stage ST moves from the inspection start position Pb to the inspection completion position Pc. The data obtained by the preliminary scanning is used (or included) as basic data of the comparison data such as background brightness. In the embodiment, when the sample W is inspected from the center toward the an outer periphery, the sample W is scanned in a spiral trajectory from the outer periphery toward the center in the preliminary scanning.

According to the embodiment, the transfer operation of the sample W can be used to collect the basic data of the comparison data, and the collection efficiency of the basic data can be improved.

REFERENCE SIGNS LIST

100: defect inspection device
A: illumination optical system
B1 to B13: detection optical system
C1 to C13': sensor
D: signal processing device
E3: monitor
JA: determination region
ST1: sample stage
ST2: scanning device
W: sample

The invention claimed is:

1. A defect inspection device for inspecting a sample having a structure repeatedly formed on a surface thereof, comprising:

a sample stage configured to support the sample;

an illumination optical system configured to illuminate the sample placed on the sample stage with illumination light;

a scanning device configured to drive and rotate the sample stage to change a relative position between the sample and the illumination optical system;

a plurality of detection optical systems configured to condense illumination scattered light from the surface of the sample;

a plurality of sensors configured to convert illumination scattered light condensed by the corresponding detection optical systems into an electric signal and output a detection signal; and a signal processing device configured to process the detection signal input from the plurality of sensors, wherein the signal processing device extracts, for any inspection portion on the surface of the sample, a comparison portion whose θ coordinates are in a set correspondence relationship with those of the inspection portion in an rθ circular coordinate system of the sample in which a center of the sample is set as an origin, compares a detection signal from the inspection portion with a detection signal from the comparison portion, and detects a defect of the sample based on a difference between the detection signals, reads data of a linear or strip-shaped determination region passing through the center of the sample as the correspondence relationship, and extracts, as the comparison portion, a portion at least a part of which overlaps the determination region that at least overlaps a part of the inspection portion or a portion on another sample corresponding to the portion.

2. The defect inspection device according to claim 1, wherein the signal processing device extracts the comparison portion from a region where a difference in r coordinates from the inspection portion is equal to or less than a set value.

3. The defect inspection device according to claim 1, wherein the sample is a patterned wafer.

4. The defect inspection device according to claim 3, wherein the inspection portion and the comparison portion are dies formed on the patterned wafer.

5. The defect inspection device according to claim 3, wherein the inspection portion and the comparison portion are parts of dies formed on the patterned wafer.

6. The defect inspection device according to claim 5, wherein the inspection portion and the comparison portion have different die coordinates.

7. The defect inspection device according to claim 1, wherein the determination region is a strip-shaped region sandwiched between two straight lines extending in a radial direction of the sample with the center of the sample as a starting end.

8. The defect inspection device according to claim 1, wherein the determination region is a strip-shaped region sandwiched between two straight lines passing through the center of the sample.

9. The defect inspection device according to claim 1, wherein the determination region is one straight line extending in a radial direction of the sample with the center of the sample as a starting end.

10. The defect inspection device according to claim 1, wherein the determination region is one straight line passing through the center of the sample.

11. The defect inspection device according to claim 1, further comprising:

a monitor configured to display an inspection condition setting screen corresponding to the θ coordinates.

12. The defect inspection device according to claim 1, wherein the signal processing device is a single computer or a plurality of computers connected via a network.

13. A defect inspection method for inspecting a sample having a structure repeatedly formed on a surface thereof, using a signal processing device including a sample stage configured to support the sample, an illumination optical system configured to illuminate the sample placed on the sample stage with illumination light, a scanning device configured to drive and rotate the sample stage to change a relative position between the sample and the illumination optical system, a plurality of detection optical systems configured to condense illumination scattered light from the surface of the sample, and a plurality of sensors configured to convert illumination scattered light condensed by the corresponding detection optical systems into an electric signal and output a detection signal, the method comprising:

extracting, for any inspection portion on the surface of the sample, a comparison portion whose θ coordinates are in a set correspondence relationship with those of the inspection portion in an rθ circular coordinate system of the sample in which a center of the sample is set as an origin;

comparing a detection signal from the inspection portion with a detection signal from the comparison portion, and detecting a defect of the sample based on a difference between the detection signals;

reading data of a linear or strip-shaped determination region passing through the center of the sample as the correspondence relationship, and extracting, as the comparison portion, a portion at least a part of which overlaps the determination region that at least overlaps a part of the inspection portion or a portion on another sample corresponding to the portion.

\* \* \* \* \*